(12) United States Patent
Song et al.

(10) Patent No.: US 12,019,474 B2
(45) Date of Patent: *Jun. 25, 2024

(54) MOBILE TERMINAL

(71) Applicant: LG ELECTRONICS INC., Seoul (KR)

(72) Inventors: Insu Song, Seoul (KR); Junghyun Jo, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 369 days.

This patent is subject to a terminal disclaimer.

(21) Appl. No.: 17/310,597

(22) PCT Filed: Jun. 24, 2019

(86) PCT No.: PCT/KR2019/007597
§ 371 (c)(1),
(2) Date: Aug. 12, 2021

(87) PCT Pub. No.: WO2020/166766
PCT Pub. Date: Aug. 20, 2020

(65) Prior Publication Data
US 2022/0124188 A1   Apr. 21, 2022

Related U.S. Application Data

(60) Provisional application No. 62/805,920, filed on Feb. 14, 2019.

(51) Int. Cl.
*H04M 1/02* (2006.01)
*G06F 1/16* (2006.01)

(52) U.S. Cl.
CPC .......... *G06F 1/1624* (2013.01); *G06F 1/1652* (2013.01); *G06F 1/1686* (2013.01);
(Continued)

(58) Field of Classification Search
CPC .... G06F 1/1624; G06F 1/1652; G06F 1/1686; H04M 1/0237; H04M 1/0241; H04M 1/0268; H04M 2201/38; H04M 2250/22
(Continued)

(56) References Cited

U.S. PATENT DOCUMENTS

2013/0058063 A1* 3/2013 O'Brien ................ G06F 1/1624
361/807
2017/0038798 A1* 2/2017 Lee ........................ G06F 1/1641
(Continued)

FOREIGN PATENT DOCUMENTS

KR       101107127        1/2012
KR     1020160141255     12/2016
(Continued)

OTHER PUBLICATIONS

PCT International Application No. PCT/KR2019/007597, International Search Report dated Nov. 14, 2019, 11 pages.

*Primary Examiner* — Tan H Trinh
(74) *Attorney, Agent, or Firm* — LEE, HONG, DEGERMAN, KANG & WAIMEY

(57) ABSTRACT

The present invention provides a mobile terminal having a flexible display. The present invention may provide a mobile terminal comprising: a first frame; a second frame movably coupled to the first frame and configured to move in a first direction with regard to the first frame; a third frame movably coupled to the second frame and configured to move in the first direction with regard to the second frame; a flexible display portion comprising a first area disposed on the front surface of the mobile terminal and coupled to the first frame, a second area disposed on the back surface of the mobile terminal and coupled to the third frame, and a third area extending between the first and second areas, the third area being wound around the second frame and selectively disposed on the front surface of the mobile terminal or on the
(Continued)

back surface of the mobile terminal according to the direction of movement of the second frame; a driving portion configured to move the second frame in the first direction with regard to the first frame and to move the third frame in the first direction with regard to the second frame.

25 Claims, 17 Drawing Sheets

(52) U.S. Cl.
CPC ....... *H04M 1/0237* (2013.01); *H04M 1/0268* (2013.01); *H04M 2201/38* (2013.01)

(58) Field of Classification Search
USPC ........................................................ 455/575
See application file for complete search history.

(56) References Cited

U.S. PATENT DOCUMENTS

| | | | |
|---|---|---|---|
| 2017/0139442 A1* | 5/2017 | Yoshizumi | G06F 1/163 |
| 2017/0212556 A1 | 7/2017 | Jovanovic | |
| 2018/0077808 A1* | 3/2018 | Seo | G06F 3/044 |
| 2020/0264660 A1* | 8/2020 | Song | H04M 1/0237 |
| 2020/0267246 A1* | 8/2020 | Song | H05K 1/148 |
| 2020/0267247 A1* | 8/2020 | Song | H04M 1/0237 |

FOREIGN PATENT DOCUMENTS

| | | |
|---|---|---|
| KR | 1020180030301 | 3/2018 |
| KR | 1020190004618 | 1/2019 |

\* cited by examiner

FIG. 3
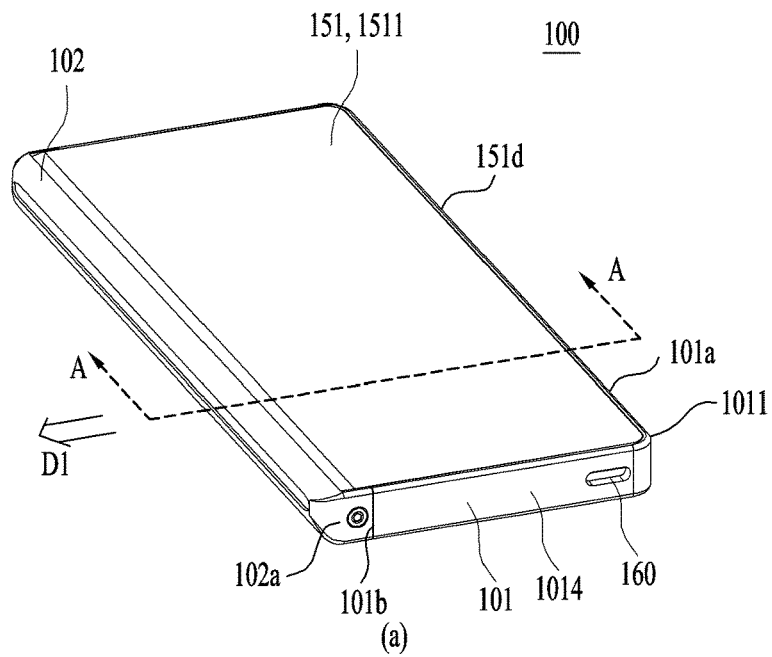
(a)
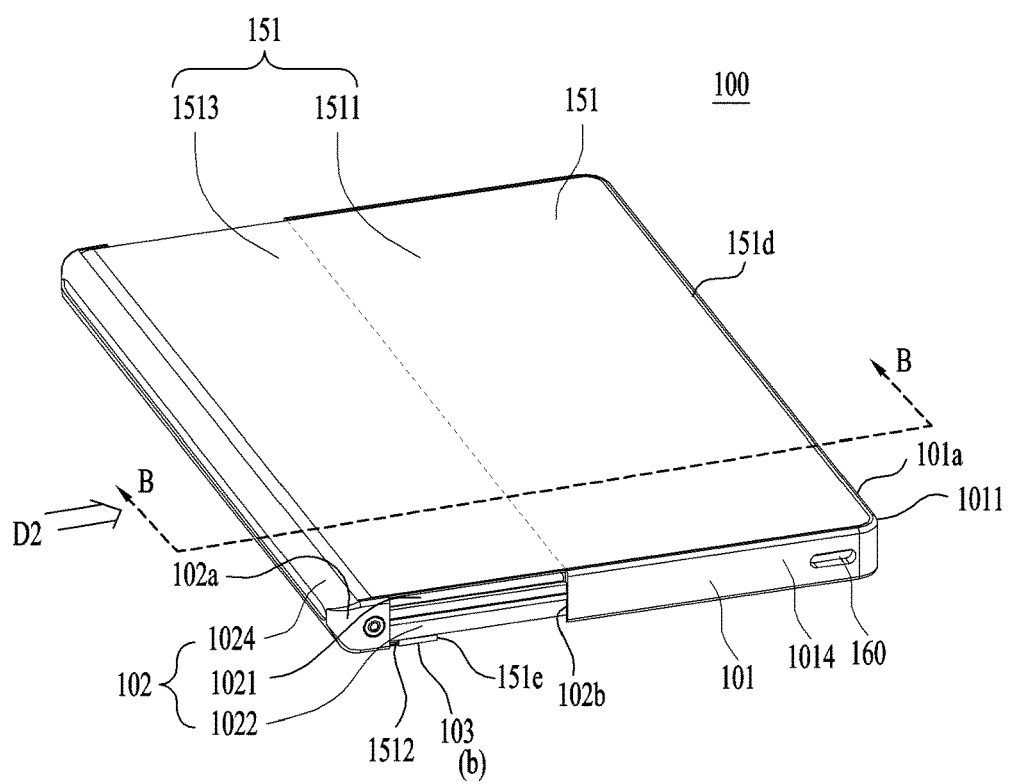
(b)

FIG. 4
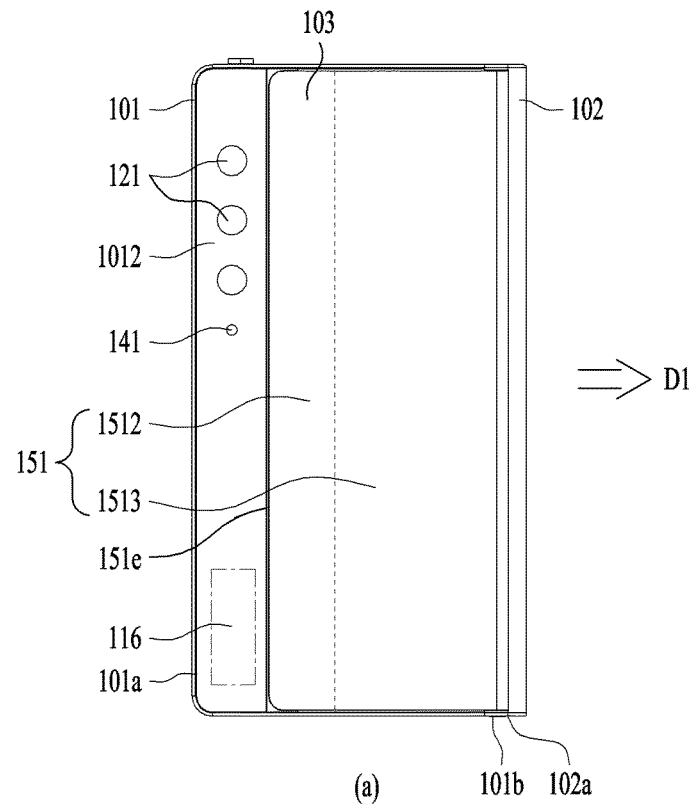
(a)
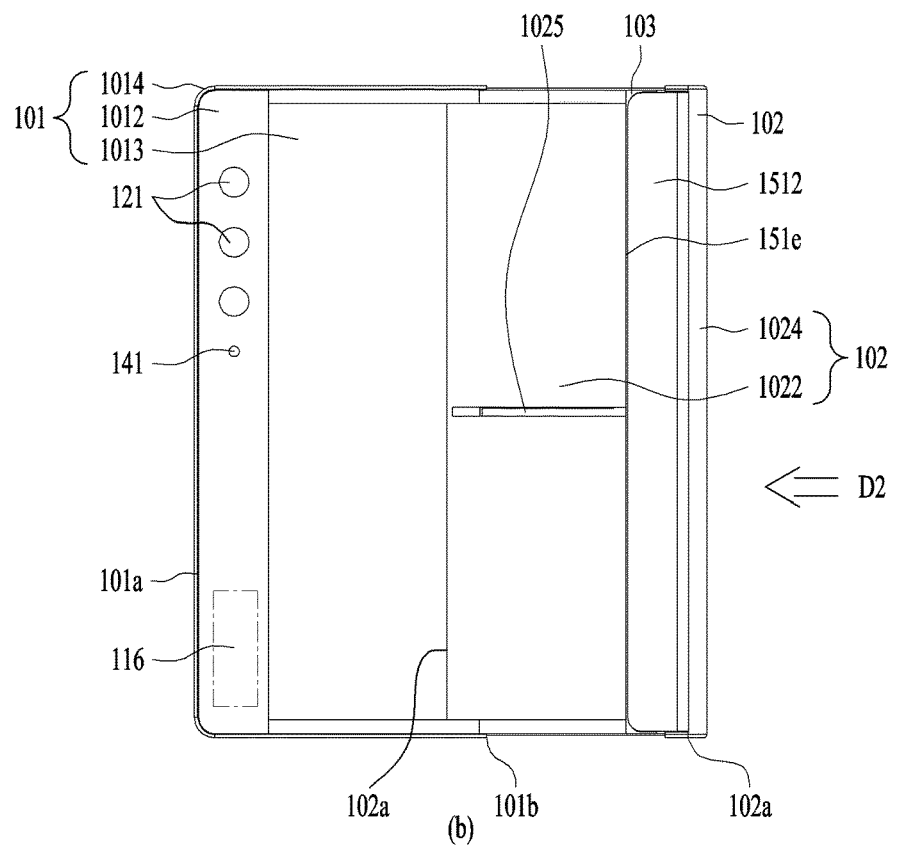
(b)

FIG. 7
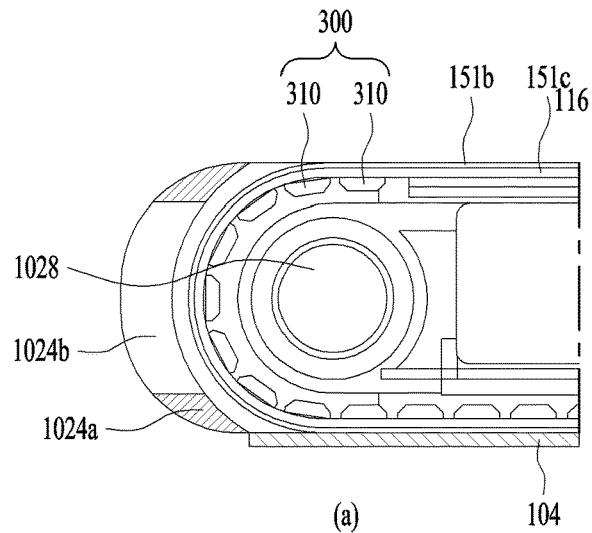
(a)
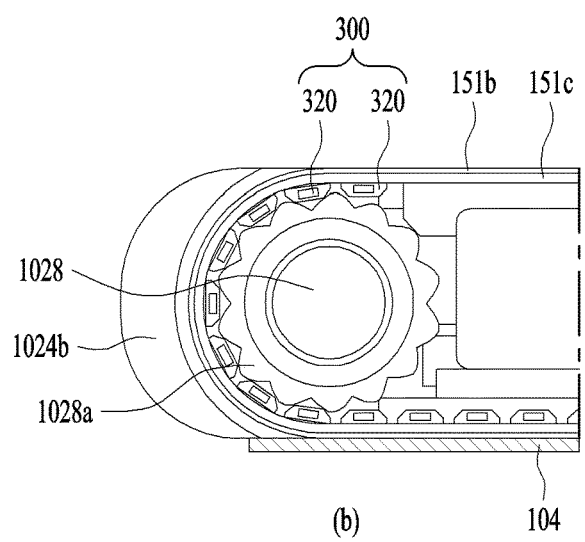
(b)
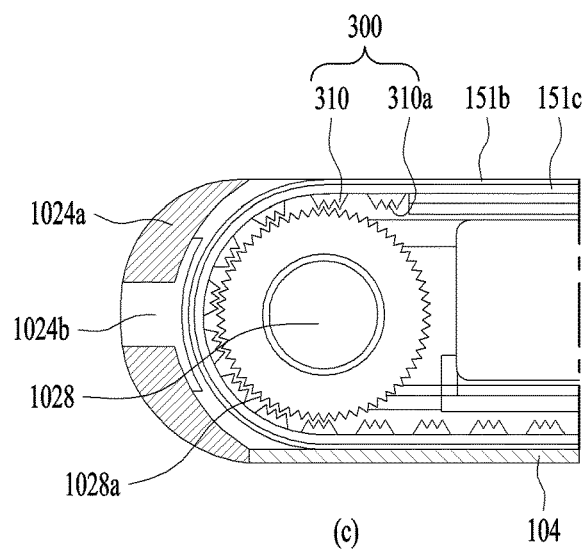
(c)

MOBILE TERMINAL

CROSS-REFERENCE TO RELATED APPLICATIONS

This application is the National Stage filing under 35 U.S.C. 371 of International Application No. PCT/KR2019/007597, filed on Jun. 24, 2019, which claims the benefit of U.S. Provisional Patent Application No. 62/805,920, filed on Feb. 14, 2019, the contents of which are all incorporated by reference herein in their entirety.

TECHNICAL FIELD

The present disclosure relates to a wireless communication system, and more particularly, to a mobile terminal in which an available size of a display or screen may be controlled.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal Recently, functions of the mobile terminal have been considerably diversified owing to the developments of the broadcasting technology and the network technology, and performance of the mobile terminal has been correspondingly improved. In particular, the mobile terminal has been developed to provide a user with various contents as well as with a simply broadcasted content. For instance, the mobile terminal can provide not only programs received from a broadcasting station but also game plays, music listening, internet shopping, user-customized information and the like using various applications. In order to perform the extended functions, the mobile terminal is basically connected to other devices or networks using various communication protocols and can provide a user with ubiquitous computing. In particular, a mobile terminal has been evolved into a smart device that enables the connectivity to networks and the ubiquitous computing.

Meanwhile, a flexible display capable of considerable deformation with sufficient elasticity has been developed recently. Such a flexible display can be deformed enough to be rolled up into a body of the mobile terminal. The mobile terminal is capable of accommodating a rolled-up flexible display and projecting the display in a desired size out of its body. Hence, using the flexible display, the mobile terminal can have a compacter structure and a display extendable in a desired size. Thus, the mobile terminal needs to be improved in structural and functional aspects to maximize the advantages attributed to the flexible display.

DISCLOSURE

Technical Problem

An object of the present disclosure is to provide a mobile terminal configured to include a flexible display so that an available or effective display or screen may be controlled stably and reliably.

Another object of the present disclosure is to provide a mobile terminal configured not to confine a deformed portion of a flexible display to a specific location.

Another object of the present disclosure is to provide a mobile terminal configured to stably support an extended flexible display.

Another object of the present disclosure is to provide a mobile terminal configured to prevent a deformed portion of a flexible display from being damaged by an external impact.

Technical Solution

To achieve the above objects, the present disclosure may provide a mobile terminal. The mobile terminal may include a first frame, a second frame movably coupled with the first frame and configured to move in a first direction with respect to the first frame, a third frame movably coupled with the second frame and configured to move in the first direction with respect to the second frame, a flexible display including a first region disposed on a front surface of the mobile terminal and coupled with the first frame, a second region disposed on a rear surface of the mobile terminal and coupled with the third frame, and a third region extending between the first region and the second region, wherein the third region is rolled in the second frame and selectively disposed on the front surface of the mobile terminal or the rear surface of the mobile terminal according to a movement direction of the second frame, and a driving unit configured to move the second frame in the first direction with respect to the first frame and move the third frame in the first direction with respect to the second frame. The driving unit may be configured to transition the mobile terminal from a first state to a second state by moving the second and third frames in the first direction, wherein only the first region of the flexible display unit is disposed on the front surface of the mobile terminal in the first state, and the third region is disposed together with the first region on the front surface of the mobile terminal in the second state, withdraw the third region from the second frame to the front surface of the mobile terminal according to the movement of the second frame in the first direction, for the transition to the second state, and synchronize the movement of the third frame with the movement of the second frame.

The driving unit may be configured to move the second frame and the third frame in a second direction opposite to the first direction, transition the mobile terminal from the second state to the first state by moving the second and third frames in the second direction, and retract the withdrawn third region from the front surface of the mobile terminal to the second frame, for the transition to the first state.

Additionally, the driving unit may be configured to synchronize a position at which the third frame starts moving with a position at which the second frame starts moving. The driving unit may be configured to synchronize a time point at which the third frame starts moving with a time point at which the second frame starts moving. Further, the driving unit may be configured to synchronize a movement speed of the third frame with a movement speed of the second frame.

The driving unit may include a support coupled with the first frame, a first actuator coupled with the support to be movable in the first direction and coupled with the second frame, and a second actuator coupled with the first actuator to be movable in the first direction and coupled with the third frame. The driving unit may be configured to synchronize movement of the second actuator with movement of the first actuator.

The support may include sidewalls facing both sides of the first actuator and configured to support movement of the first actuator.

The first actuator may include a power source configured to supply power to the first actuator, and may be configured to move in the first direction by rotation of the power source in a first rotation direction. More specifically, the first actuator may include a thruster movably coupled with the support, and a coupler configured to transmit the power from the power source to the thruster, and the thruster may be configured to thrust the second frame in the first direction by using the power transmitted by the coupler.

The coupler may be configured to couple the power source with the thruster by using a gear and transform a rotation movement of the power source into a linear movement. More specifically, the coupler may include a rack provided on the thruster and extending along a length direction of the thruster, and a pinion provided on the power source and engaged with the rack, and the pinion may be configured to linearly move the engaged rack and the thruster, while rotating.

The power source may include a motor, and a gear train rotatably coupled with the motor and including a plurality of intermeshing gears. The gear train may be configured to reduce a rotation speed of the motor input to the gear train.

The driving unit may include a guide configured to guide movement of the first actuator with respect to the support. The guide may include a flange protruding from the first actuator toward the support and extending in a length direction of the first actuator, and a recess formed in the support along a length direction of the support and configured to accommodate the flange. The guide may further include a retainer formed on a surface of the recess facing the flange, and a bearing accommodated in the retainer and contacting a surface of the flange.

The second actuator may be configured to be moved by the first actuator. More specifically, the second actuator may be configured to freely move together with the third frame in the first direction during movement in the first direction, and to be forcedly moved in the second direction by the first actuator during movement in the second direction. Further, the second actuator may be configured to, when the first actuator moves in the first direction, receive power in the first direction from the second frame and the flexible display unit moved by the first actuator, and when the first actuator moves in the second direction, receive power in the second direction directly from the first actuator.

More specifically, the second actuator may include a head movably coupled with the first actuator, and a belt coupled to each of the head and the support, and rolled in the first actuator, and the belt may be configured to synchronize movement of the head with movement of the first actuator. The belt may be configured to move the head in the same direction as a movement direction of the first actuator. The belt may be configured to be rolled out from the first actuator or rolled in the first actuator according to a movement direction of the first actuator, to move the head in the same direction as the movement direction of the first actuator. Further, when the first actuator moves in the first direction, the belt may be configured to be rolled out from the first actuator to move the head together with the third frame coupled to the head in the first direction, and when the first actuator moves in the second direction, the belt may be configured to be rolled in the first actuator to pull the head in the second direction.

The second actuator may further include a pulley installed on the first actuator and configured to feed the belt in the first direction or the second direction according to a movement direction of the first actuator. The pulley may be configured to feed the belt in the same direction as the movement direction of the first actuator.

The first actuator may further include a guide slot formed along a length direction of the first actuator and configured to accommodate the second actuator and guide movement of the second actuator.

Advantageous Effects

According to the present disclosure, a mobile terminal may include a plurality of frames movably coupled with each other. Extension and contraction of a flexible display by relative movements of these frames, precisely, extension and contraction of a flexible display region exposed on the front surface of the mobile terminal may be effectively guided. Accordingly, the mobile terminal may stably and reliably adjust the size of an available display or screen by the combination of the flexible display and the frames.

Additionally, the flexible display may be configured to be rolled in or rolled out from a frame of the mobile terminal, for extension and contraction. Accordingly, since a deformed portion of the flexible display is continuously changed during the rolling, a specific portion of the flexible display may not be continuously deformed. Accordingly, fatigue and damage of the specific portion of the flexible display may be prevented, thereby increasing the durability of a flexible display unit.

Additionally, frames may extend and contract together when the flexible display is extended and contracted. Accordingly, the extended or contracted flexible display may be stably supported by the frames. Further, the frames are configured to cover a deformed portion of the flexible display, particularly a rolled portion, thereby preventing the deformed portion of the flexible display from being damaged by an external impact.

BRIEF DESCRIPTION OF THE DRAWINGS

FIG. 3 is a perspective view illustrating first and second states of the mobile terminal viewed from one side;

FIG. 4 is a rear view illustrating the first and second states of the mobile terminal;

FIG. 7 is a sectional view illustrating side frames, taken along lines C-C, D-D and E-E of FIG. 6;

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Embodiments described herein include configurations for applying a flexible display to a mobile terminal. However, the principles and configurations of the described embodiments may be equally applied to every display device using a flexible display.

Figure 1:
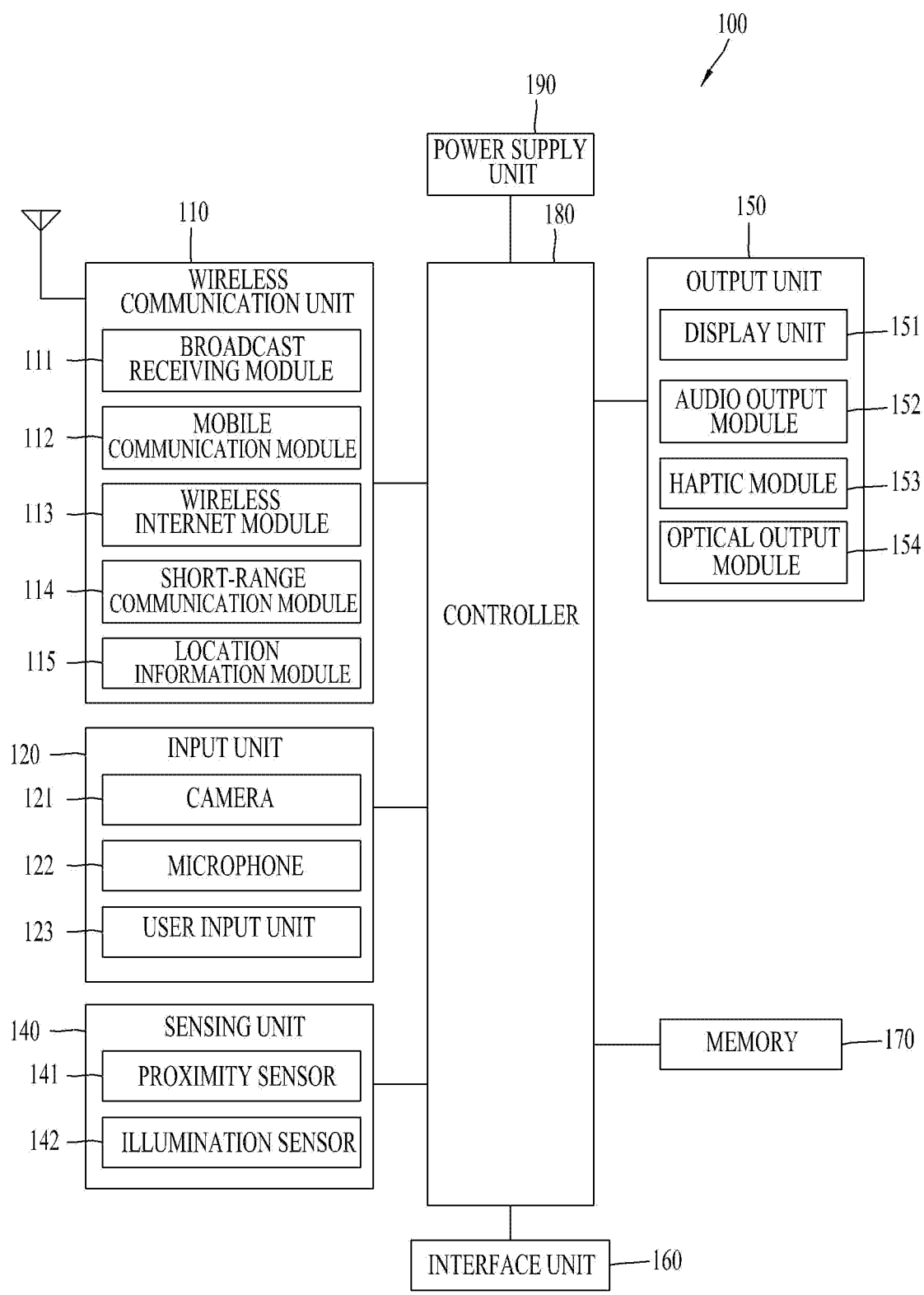
FIG. 1 is a block diagram illustrating an overall configuration of a mobile terminal according to the present disclosure.

FIG. 1 is a block diagram of a mobile terminal in accordance with the present disclosure.

The mobile terminal 100 is illustrated as having components such as a wireless communication unit 110, an input unit 120, a sensing unit 140, an output unit 150, an interface unit 160, a memory 170, a controller 180, and a power supply unit 190. It is understood that implementing all of the illustrated components in The FIG. 1 is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is illustrated having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
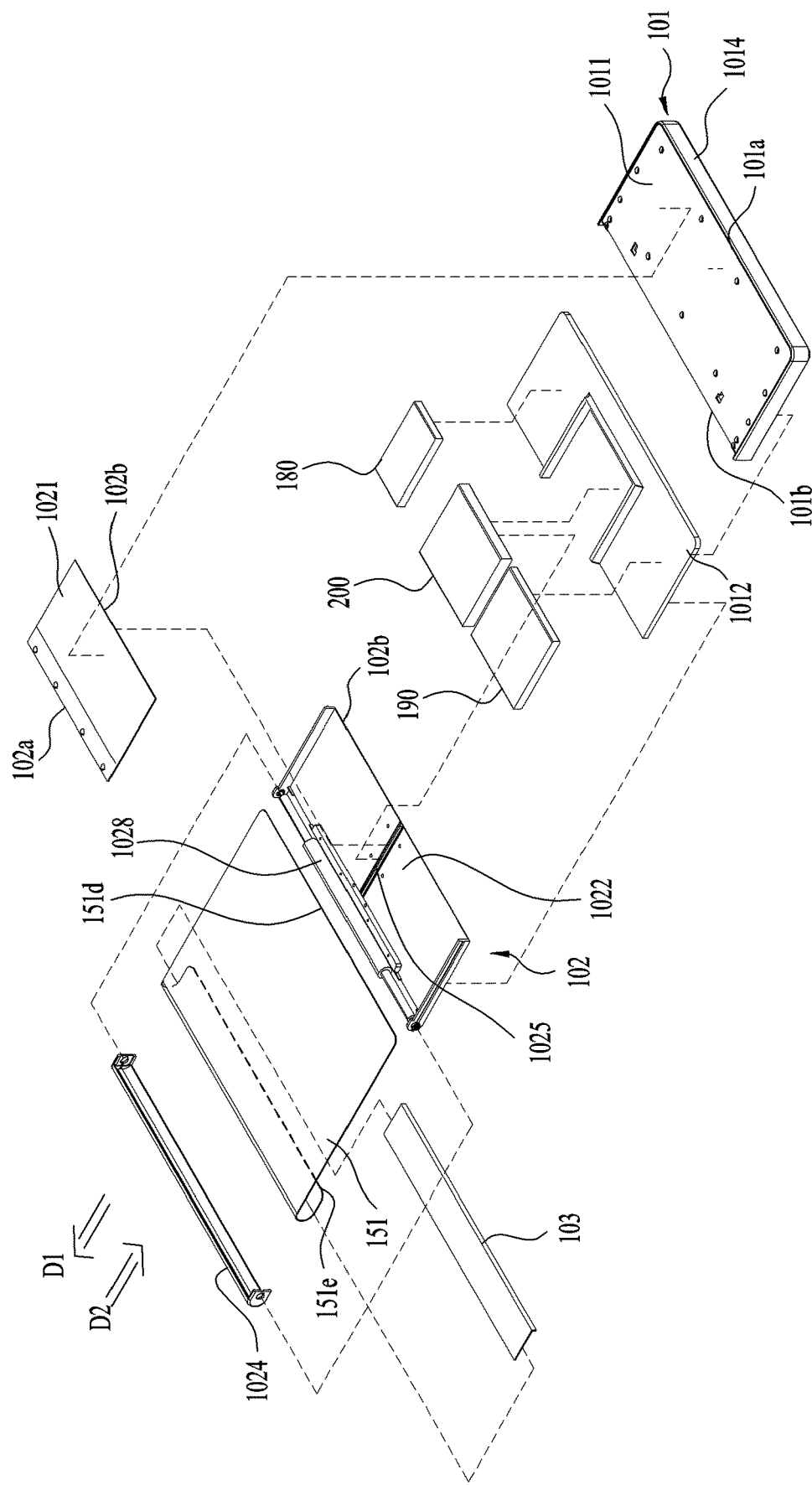
FIG. 2 is an exploded perspective view illustrating the mobile terminal according to the present disclosure.
Figure 5:
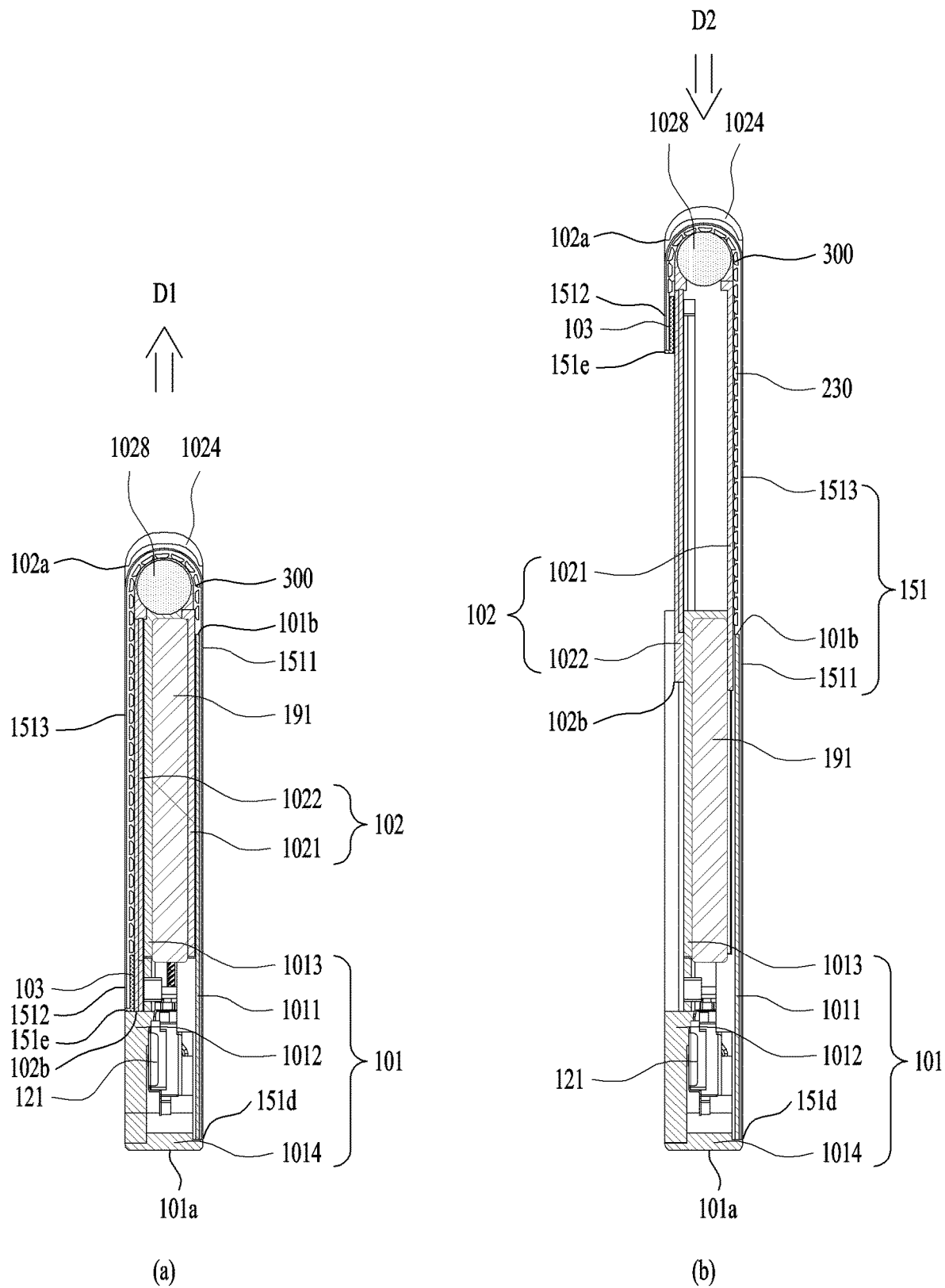
FIG. 5 is a sectional view illustrating the first and second states of the mobile terminal, taken along lines A-A and B-B of FIG. 2, respectively.

FIG. 2 is an exploded perspective view illustrating a mobile terminal according to the present disclosure. FIG. 3 is a perspective view illustrating first and second states of a mobile terminal viewed in one lateral side. FIG. 4 is a rear view illustrating first and second states of a mobile terminal. FIG. 5 is a sectional view illustrating first and second states of a mobile terminal, obtained along the cutting lines A-A and B-B of FIG. 2, respectively. In the above drawings, FIG. 3(a), FIG. 4(a) and FIG. 5(a) illustrate a first state of a mobile terminal and FIG. 3(b), FIG. 4(b) and FIG. 5(b) illustrates a second state of the mobile terminal.

As illustrated in the drawings, a mobile terminal 100 of a first state is contracted (or retracted) and has a size smaller than that of the mobile terminal 100 of a second state. Moreover, a size of a display 151 located on a front surface of the mobile terminal 100 becomes smaller than that in a second state. On the other hand, the mobile terminal 100 of the first state is extended in a first direction D1 so as to switch to the second state. In the second state, a size of the mobile terminal 100 and a size of the display 151 located on the front surface become greater than those of the first state. In the following description, a direction in which the mobile terminal 100 and the display 151 thereof are extended (or enlarged) is referred to as a first direction D1, a direction in which the mobile terminal 100 and the display 151 thereof are contracted (or retracted) or reduced is referred to as a second direction D2, and a direction vertical to the first and second directions D1 and D2 is referred to as a third direction.

The mobile terminal 100 of the present disclosure may switch from the first state in which the display 151 is located on the front surface like a bar-type mobile terminal like FIG. 3(a) to the second state by extending the screen like FIG. 3(b). In the second state, a size of the display 151 located on the front surface is enlarged and a size of the display 151 located on a rear surface is reduced like FIG. 4(b). Namely, the display 151 used to be located on the rear surface of the mobile terminal 100 in the first state is moved to the front surface of the mobile terminal 100 in the second state.

Thus, in order for a position of the display to be variable, the display may employ a flexible display unit 151. A flexible display means a display that is light-weighted, easily-unbreakable and heavy-duty display fabricated on a thin and flexible substrate capable of curving, bending, folding, twisting and rolling-up like a paper by maintaining the properties of the existing flat panel display.

Moreover, an electronic paper employs a display technology provided with the features of the normal ink and may differ from the existing flat panel display in using reflective light. The electronic paper may change information by electrophoresis using twist balls or capsules.

In a state that the flexible display unit 151 is not deformed (e.g., a state having an infinite curvature radius: hereinafter a basic state), a display region of the flexible display unit 151 becomes a plane. In a state deformed from the basic state by an external force (e.g., a state having a finite curvature radius: hereinafter a deformed state), the display region may become a curved surface. As illustrated in the drawing, information displayed in the deformed state may become visual information outputted to the curved surface. Such visual information is implemented in a manner that light emittance of subpixels deployed in a matrix form is controlled independently. The subpixel means a minimum unit for implementing a single color.

The flexible display unit 151 may lie not in a flat state but in a curved state (e.g., a top-bottom or right-left curved state) from the basic state. In this case, if an external force is applied to the flexible display unit 151, the flexible display unit 151 may be deformed into a flat state (or a less-curved state) or a more-curved state.

Meanwhile, the flexible display unit 151 may implement a flexible touchscreen by being combined with a touch sensor. If a touch is applied to the flexible touchscreen, the controller 180 (see FIG. 1) may perform a control in response to such a touch input. The flexible touchscreen may be configured to sense a touch input in the deformed state as well as in the basic state.

The touch sensor senses a touch (or a touch input) applied to the touchscreen using at least one of various touch types such as a resistance layer type, an electrostatic capacitance type, an infrared type, an ultrasonic type, etc.

For example, a touch sensor may be configured to convert a pressure applied to a specific portion of a touchscreen or a variation of electrostatic capacitance generated from the specific portion into an electric input signal. A touch sensor may be configured to detect a position or size of the touch sensor touched by a touch target applying a touch to a touchscreen, a pressure of the touch, an electrostatic capacitance of the touch, etc.

Meanwhile, a deformation sensing means for sensing deformation of the flexible display unit 151 may be provided to the mobile terminal 100. Such a deformation sensing means may be included in the sensing unit 140 (see FIG. 1).

The deformation sensing means is provided to the flexible display unit 151 or the case (or housing) (i.e., first to third frame 101 to 103 described later), thereby sensing information related to deformation of the flexible display unit 151. Here, the information related to the deformation includes a deformed direction of the flexible display unit 151, a deformed extent, a deformed position, a deformed time, a restored acceleration of the deformed flexible display unit 151, etc., and may further various kinds of information sensible as the flexible display unit 151 is curved.

Based on the information related to the deformation of the flexible display unit 151 and sensed by the deformation sensing means, the controller 180 may change information displayed on the flexible display unit 151 or generate a control signal for controlling a function of the mobile terminal 100.

The size changes of the display unit 151 on the front and rear surfaces of the mobile terminal according to the state switching (first or second state) of the flexible display unit 151, i.e., the size change of the mobile terminal 100 may be performed manually by a force applied by a user, which is non-limited by the manual way. For example, when the mobile terminal 100 or the flexible display unit 151 is in the first state, it may be deformed into the second state by a command of a user or application without an external force applied by the user. Thus, in order for the flexible display unit 151 to be automatically deformed without such an external force, the mobile terminal 100 may include a driving unit 200 described later.

The flexible display unit 151 of the present disclosure is rolled round a predetermined one of both side parts of the mobile terminal 100, thereby being folded at 180°. Hence, one portion of the display unit 151 is disposed on the front surface of the mobile terminal 100 with reference to such a side part, while the rest is disposed on the rear surface of the mobile terminal 100. Some portion of the display unit 151 located on the front surface of the mobile terminal 100 may be fixed to the front surface not to move, while the rest of the display unit 151 located on the rear surface of the mobile terminal 100 may be provided to be movable on the rear surface. The display unit 151 may be rolled or unrolled round the side part, whereby a size of the region disposed on the front surface of the mobile terminal 100 may be adjusted by moving a part of the display unit 151 disposed on the rear surface of the mobile terminal 100. Since a size of the flexible display unit 151 is determined and the flexible display unit 151 includes a single continuous body, if a size of the flexible display unit 151 located on the front surface of the mobile terminal 100 is increased, a size of the flexible display unit 151 located on the rear surface of the mobile terminal 100 is decreased. The above-configured display unit 151 may be rolled within the second frame 102 relatively movable to the first frame 101, which will be described later, and more specifically, around a predetermined side part of the second frame 102, and withdrawn (or pulled out) from or inserted (or pushed) into the second frame 102 by being rolled around the second frame 102 along a moving direction of the second frame 102 to adjust the size of the display unit 151 on the front surface of the mobile terminal 100. Such an operation will be described in detail together with other related components of the mobile terminal 100.

Typically, an antenna is provided to the case of housing of the mobile terminal 100. Yet, an antenna installed portion of the case or housing may be restricted by the flexible display unit 151 that covers the front surface of the mobile terminal 100 up to the rear surface. For that reason, an antenna may be implemented on the flexible display unit 151. An Antenna On Display (AOD) includes an antenna configured in a manner of forming a transparent film with patterned electrode layers and dielectric layers laid one upon another. As the AOD can be implemented thinner than Laser Direct Structuring (LDS) with Cu-Ni plating, it barely affects thickness and does not come into view, advantageously. And, the AOD may directly transceive signals with the display unit 151. Therefore, the AOD is available for the mobile terminal 100 having the display unit 151 located on both sides thereof.

Specific configuration of the mobile terminal 100 of the present disclosure is described in detail with reference to FIGS. 2 to 5 as follows. In the following description, FIG. 2 illustrating the overall configuration is referred to basically and FIGS. 3 to 5 are referred to describe the specific features of the corresponding components in the first and second states of the mobile terminal 100.

The mobile terminal 100 of the present disclosure may include a first frame 101, a second frame 102 moving in a first direction against the first frame 101, and a third frame 103 moving in the first direction against the second frame 102. The first and second frames 101 and 102 include a front part, a rear part and a lateral part, which are coupled together. Therefore, the mobile terminal 100 may form a hexahedral exterior with the coupled first and second frames 101 and 102. Considering the configuration of the illustrated first to third frames 101 to 103, movement of the second and third frames 102 and 103 may become slide movement.

First of all, the first frame 101 corresponds to a main body of the mobile terminal 100 and may form a space inside to receive various parts therein. And, the first frame 101 may receive the second frame 102, which is movably coupled to the first frame 101, within such a space. Particularly, as illustrated in FIG. 2 and FIG. 5, the first frame 101 may include a first front part 1011 disposed on the front surface of the mobile terminal 100 and first and second rear parts 1011 and 1012 disposed on the rear surface of the mobile terminal 100. Each of the first front part 1011, the first rear part 1012 and the second rear part 1013 may include an approximately flat plate-type member. The first rear part 1012 and the second rear part 1013 may include separate members coupled together or a single member illustrated in the drawing. In order to form a predetermined space, the first font part 1011 and the first/second rear part 1012/1013 may be spaced apart from each other in a predetermined gap and connected to each other by a lateral part 1014. As parts of the mobile terminal 100, the controller 180 and the power supply unit 190 may be received in the space within the first frame 101. For example, the controller 180 may include a circuit board including a processor and electronic circuit for controlling operations of the mobile terminal 100 and the power supply unit 190 may include a battery and related parts. Moreover, the second frame 102 and the driving unit 200 described alter may be received in the first frame 101 as well.

As described above, the display unit 151 has the continuous body and may be disposed on both of the front and rear surfaces of the mobile terminal 100 by being rolled up within the mobile terminal 100. Hence, a portion of the display unit 151 may be disposed on the first front part 1011 corresponding to the front surface of the mobile terminal 100 and the rest may be disposed on the first and second rear parts 1012 and 1013 corresponding to the rear surface of the mobile terminal 100, simultaneously. On the other hand, as well illustrated in FIG. 4, for the installation of various physical input units 120 and sensor units 140 for manipulations of the mobile terminal 100, the display unit 151 may be disposed on the second rear part 1013 only. Since the first rear part 1012 is always exposed externally, the input unit 120 such as various buttons, switches, the camera 121 and a flash and the sensor unit 140 such as the proximity sensor 141 may be disposed on the first rear part 1012. A typical bar-type terminal includes a display unit provided to a front surface of the terminal only. Hence, a camera is disposed on a rear surface of the terminal in order to capture an image by viewing a thing located at the opposite side of a user through a display unit. In order for the user to capture himself by viewing himself through the display unit, an additional camera needs to be provided to the front surface of the terminal. Yet, according to the mobile terminal 100 of the present disclosure, the display unit 151 is located on both of the front and rear surfaces thereof. Therefore, when a user takes a selfie, the display unit located on the same side of the camera 121, i.e., a portion of the display unit 151 located on the rear surface of the mobile terminal 100 in the drawing may be used. When a thing at the opposite side of the user is captured, the display unit located on the opposite side of the camera 121, i.e., a portion of the display unit 151 on the front surface of the mobile terminal 100 in the drawing may be used. For that reason, the mobile terminal 100 may capture a thing located at the opposite side of a user or a selfie using the single camera 121. The camera may include a plurality of cameras of different view angles such as a wide angle, a super wide angle, a telescope, etc. A proximity sensor, an audio output module and the like may be located on the first rear part 1012 as well as the camera, and an antenna 116 may be installed thereon.

The lateral part 1014 may be elongated along edges of the first front part 1011 and the first/second rear part 1012/1013 to enclose a circumference of the first frame 101 and form an exterior of the mobile terminal 100. Yet, as mentioned above, since the second frame 102 is received in the first frame 101 and movably coupled thereto, a portion of the first frame 101 needs to be open to allow the relative movement of the second frame 102 to the first frame 101. As well illustrated in FIG. 2, for example, since the second frame 102 is movably coupled to one of both side parts of the first frame 101, the lateral part 1014 is not formed at such a side part, thereby opening it. Hence, the first frame 101 may include a first side part 101a substantially closed and a second side part 101b disposed to oppose the first side part 101a so as to be open. Since the lateral part 1014 is exposed from the mobile terminal 100, the interface unit 160 for connecting to a power port or an earphone jack or the user input unit 120 such as a volume button and the like may be disposed thereon. In case of containing metal substance, the lateral part 1014 may play a role as an antenna.

Referring to FIG. 2, the second frame 102 may include a second front part 1021 disposed on the front surface of the mobile terminal 100 and a third rear part 1022 disposed on the rear surface of the mobile terminal 100. Like the first front part 1011, the first rear part 1012 and the second rear part 1013 of the first frame 101, each of the second front part 1021 and the third rear part 1022 may be formed of an approximately flat plate-type member. Moreover, the second frame 102 may receive various parts therein and should not interfere with the parts received in the first frame 101 while moving. Hence, the second front part 1021 and the third rear part 1022 may be coupled together in a manner of being spaced apart from each other and have a shape not interfering with the parts within the first frame 101.

Moreover, the display unit 151 may be folded at 180° while being rolled up within the second frame 102 so as to be disposed on both of the front and rear surfaces of the mobile terminal 100. For such arrangement of the display 151, the second frame 102 may include a roller 1028 rotatably disposed therein. The roller 1028 may be disposed at a random position within the second frame 102. Yet, the display 151 should be spread flat on the front and rear surfaces of the mobile terminal 100 to provide a user with a screen of a good quality. For such a spread, an appropriate tension should be provided to the display 151. In order to provide the appropriate tension, the roller 1028 may be preferably located distant from the first side part 101a of the first frame 101 adjacent to a side edge (or a side end) (i.e., a side end 151d in the drawing) of the display 151. As illustrated in FIG. 2, the second frame 102 includes two first and second side parts 102a and 102b confronting each other, and the first side part 102a may be located farther than the second side part 102b from the first frame, and more specifically, the first side part 101a of the first frame. For that reason, the roller 1028 may be disposed on the first side part 102a of the second frame 102 confronting the first side part 101a of the first frame 101. The roller 1028 may be elongated in a length direction of the mobile terminal 100, i.e., a length direction of the second frame 102, and coupled to the second frame 102, and more specifically, to top and bottom sides of the third rear part 1022. The display unit 151 may be rolled around the roller 1028 by being gradually curved with a predetermined curvature. Moreover, the roller 1028 may be installed to freely rotate on the second frame 102 by contacting with an inner surface of the display unit 151. Therefore, the roller 1028 is substantially capable of moving the display unit 151 in a direction vertical to a lateral direction, i.e., a length direction of the mobile terminal 100. As described later, when the second frame 102 is slid, the display unit 151 is moved by the tension applied by the second frame 102 to the front or rear surface of the mobile terminal 100 relatively to the second frame 102 in a different direction (i.e., the first direction D1 or the second direction D2). In doing so, such a movement may be guided by the roller 1028 that is rotating.

Moreover, the roller 1028 is disposed on the first side part 102a of the second frame 102, and the first side part 102a substantially corresponds to a most outer side part of the mobile terminal 100. If the first side part 102*a* of the second frame 102 is exposed, the display unit 151 rolled around the roller 1028 may be broken or damaged. Hence, the second frame 102 may include a side frame 1024 disposed on the first side part 102*a*. The side frame 1024 may be elongated long in a length direction of the second frame 102 so as to cover the first side part 102*a*, thereby protecting the roller 1028 and the display unit 151 rolled around the roller 1028. By the side frame 1024, the second frame 102 may have the first side part 102*a* that is substantially closed. And, the side frame 1024 may substantially form an exterior of the mobile terminal 100 together with the lateral part 1014 of the first frame 101. Moreover, in order to minimize the interference with the parts within the frame 101 in the course of moving, the second frame 102 may include a second side part 102*b* disposed to confront the first side part 102*a* and configured open.

The above-configured second frame 102 is movably coupled to the first frame 101, thereby being configured to slide in a predetermined first or second direction D1 or D2 against the first frame 101. Specifically, as illustrated in the drawing, the second frame 102 may be movably coupled to the first frame 101 through the side part of the first frame 101, and more particularly, through the open second side part 101*b*. More specifically, the second side part 102*b* of the second frame 102 is disposed relatively adjacent to the closed first side part 101*a* of the first fame 101, whereby the first side part 102*a* of the second frame 102 may be disposed to control the first side part 101*a*. Therefore, the second side part 102*b* is inserted into the first frame 101 through the side part of the first frame 101, i.e., the second side part 10*b* thereof. The first side part 102*b* is not inserted into the first frame 101 but is always located outside the first frame 101, thereby forming the exterior of the mobile terminal 100 as described above. Yet, if necessary, the first side part 102*b* of the second frame 102 may be inserted into the first frame 101.

Owing to the above location relation, the second frame 102 may be enlarged or contracted from the first frame in a direction vertical to a length direction of the mobile terminal 100 or the first frame 101. Namely, each of the first and second directions D1 and D2 may be a direction vertical to a length direction of the mobile terminal 100 or the first frame 101 basically. On the other hand, each of the first and second directions D1 and D2 may be explained as a lateral or horizontal direction of the mobile terminal 100 or the first frame 101. Moreover, in the movement of the first direction D1, the second frame 102 is extended from the first frame 101, whereby the first direction D1 may become a direction that the second frame 102 gets away from the first frame 101, i.e., a direction the second frame 102 moves outwardly from the mobile terminal or the first frame 101. On the other hand, in the movement of the second direction D2, the second frame is contracted toward the first frame 101. Hence, the second direction D2 is a direction confronting the first direction D1 and may become a direction that the second frame 102 gets closer to the first frame 101, i.e., a direction that the second frame 102 moves inwardly into the mobile terminal 100 or the first frame 101. When moving in the first direction D1, the second frame 102 is extended and applies a force to a portion of the display unit 151 used to be disposed on the rear surface of the mobile terminal 100 so as to dispose it on the front surface of the mobile terminal 100 additionally, thereby forming a region for such an additional disposition. Therefore, the second frame 102 may switch the mobile terminal 100 to the second state of having a relatively extended front display 151 by the movement in the first direction D1. On the other hand, when moving in the second direction D2, the second frame 102 is contracted into the original state and applies a force to a portion of the display unit 151 used to be disposed on the front surface of the mobile terminal 100 so as to return it to the rear surface of the mobile terminal 100. Therefore, by the movement in the second direction D2, the second frame 102 may switch the mobile terminal 100 to the first state of having a relatively reduced front display unit 151. Thus, the second frame 102 selectively exposes the display unit 151 on the front surface of the mobile terminal 100 according to the moving direction (i.e., the first direction D1 or the second direction D2), thereby switching the mobile terminal 100 to the above-defined first or second state.

In the course of the above-mentioned extension and contraction in the first and second directions D1 and D2, the second frame 102 may overlap with the first frame 101, and more specifically, with the first front part 1011, the first rear part 1012 and the second rear part 1013 of the first frame 101 so as not to interfere with the first frame 101. Particularly, as described above, the display unit 151 may be coupled by the first front part 1011 of the first frame 101 and then supported by it, thereby being unnecessary to be additionally supported by the second front part 1021 of the second frame 102. Instead, if the second front part 1021 is inserted between the first front part 1011 and the display unit 151, the display unit 151 may be deformed or broken by the friction with the second front part 1021 that is moving repeatedly. Hence, as well illustrated in FIG. 5, the second front part 1021 may be disposed below the first front part 1011. Namely, a front surface of the second front part 1021 may confront a rear surface of the first front part 1011. Moreover, in order to stably support the movement of the second frame 102, the rear surface of the first front part 1011 may contact with the front surface of the second front part 1021. As described above, a portion of the display unit 151 is moved to the front surface and the rear surface of the mobile terminal 100 according to the moving direction D1 or D2 of the second frame 102. Hence, in order for the display unit 151 to move smoothly, it may be advantageous that the display unit 151 is configured to move together with the second frame 102 instead of the first frame 101 that is stopped relatively. In order to move by linking to the second frame 102, the display unit 151 may need to be coupled to the second frame 102. Hence, the third rear part 1022 of the second frame 102 may be disposed below the second rear part 1013 of the first frame 101. Namely, a front surface of the third rear part 1022 may confront the rear surface of the second rear part. In order to stably support the movement of the second frame 102, the rear surface of the second rear part 1013 may contact with the front surface of the third rear part 1022. By such disposition, the third rear part 1022 may be exposed from the first frame 101, and more exactly, from the second rear part 1013 and coupled to the display unit 151.

The second frame 102 may extend or reduce a size of the mobile terminal 100 itself, and more particularly, the front surface of the mobile terminal 100 by the extension and contraction in the first and second directions D1 and D2, and the display unit 151 should move by the extended or reduced front surface to obtain the intended first or second state. Yet, if the second frame 102 is fixed, the display unit 151 is unable to smoothly move to keep up with the extended or reduced front surface of the mobile terminal 100. For that reason, the display unit 151 may be movably coupled to the second frame 102. Particularly, the display unit 151 may include a first side end (or edge) 151*d* disposed on the front surface of the mobile terminal 100 and a second side end (or edge) 151e provided to the rear surface of the mobile terminal 100 by confronting the first side end. The first side end 151d is disposed on the front surface of the first frame 101, i.e., the front surface of the first front part 1011 of the first fame 101 in a manner of being adjacent to the side part of the mobile terminal 100, i.e., the first side part 101a of the first frame 101. On the contrary, as the second side end 151e is adjacent to the rear surface of the mobile terminal 100, i.e., the third rear part 1022 of the second frame 102, it may be coupled to the third rear part 1022 of the second frame 102 so as to be movable in the first and second directions D1 and D2. Moreover, since the display 151 is not strong structurally, the third frame 103 may be coupled to the second side end 151e. The third frame 103 may include a panel member elongated long in the length direction of the mobile terminal 100. Hence, the third frame 103 may be coupled to the second frame 102, i.e., the third rear part 1022 thereof instead of the second side end 151e so as to be movable in the first and second directions D1 and D2. The second frame 102 may include a slot 1025 elongated in a lateral direction of the mobile terminal 100 or the second frame 102, i.e., a direction vertical to the length direction thereof, and the third frame 103 may stably move by being guided by the slot 1025. The third frame 103 may include a protrusion inserted in the slot 1025 for example for the movement along the slot 1025.

Referring to FIGS. 3 to 5, in association with the above configurations of the first to third frames 103, the display unit 151 may include a first region 1511 elongated in a predetermined length from one side of the display unit 151, i.e., the first side end 151d toward the confronted second side end 151e and a second region 1512 disposed to confront the first region 1511 and elongated in a predetermined length from the second side end 151e toward the first side end 151d. And, the display unit 151 may include a third region 1513 disposed between the first region 1511 and the second region 1512. The first to third regions 1511 to 1513 are connected to one another and may form a continuous body of the display unit 151. As described above, for the movement to the front or rear surface of the mobile terminal 100 of the third region 1513 according to the moving direction of the second frame 102, the first region 151 may be fixed to the front surface of the mobile terminal 100 so as not to be movable and the second region 1512 may be movably provided to the rear surface of the mobile terminal 100. Such a configuration of the display unit 151 is described in detail as follows.

The first region 1511 may be disposed on the front surface of the mobile terminal 100, and more particularly, to the front surface of the first front part 1011. The first region 1511 is fixed to the first frame 101, i.e., the front surface of the first front part 1011 so as not to move in the course of the movement of the second frame 102, thereby being always exposed to the front surface of the mobile terminal 100. The third region 1513 is adjacent to the first region 1511 and may be rolled around the roller 1028 by extending into the second frame 102. The third region 1513 may continuously extend out of the second frame 102 so as to cover the second frame 102, i.e., the rear surface of the third rear part 1022 in part. On the other hand, the second frame 102, i.e., the third rear part 1022 is adjacent to the first frame 101, i.e., the second rear part 1013 so as to form the rear case of the mobile terminal 100 together, whereby the third region 1513 may be described as disposed on the rear surface of the first frame 101 as well.

The second region 1512 is adjacent to the third region 1513 and may be disposed on the rear surface of the mobile terminal 100, and more particularly, to the second frame 102, i.e., the rear surface of the third rear part 1022 thereof. Namely, the second region 1512 may be coupled not to the second frame 102 directly but to the third frame 103. As illustrated in FIG. 4(b), a slot 1025 extending in a lateral direction (i.e., a direction vertical to the length direction of the mobile terminal 100) is formed in the second frame 102, i.e., the third rear part 1022, and the third frame 103 may move along the slot 1025. Although FIG. 4(b) illustrates that the slot 1025 is formed on the rear surface of the second frame 102, the slot 1025 may be formed on a lateral surface of the second frame 102. The second region 1512 may move in the first or second direction D1 or D2 against the second frame 102 together with the third frame 103, but the movement of the second region 1512 may be restricted within the rear surface of the mobile terminal 100 by the slot 1025. Namely, the second region 1512 does not move out of the second frame 102 despite that the second frame 102 is extended or contracted but may move within the second frame 102 along the slot 1025 by the extended or contracted distance. Therefore, the second region 1512 may be always exposed on the rear surface of the mobile terminal 100.

Eventually, as the first region 1511 may be disposed on the front surface of the mobile terminal 100 so as to be always exposed on the front surface irrespective of the movement of the second frame 102, and the second region 1512 may be disposed on the rear surface of the mobile terminal 100 so as to be always exposed on the rear surface irrespective of the movement of the second frame 102. The third region 1513 is disposed between the first and second regions 1511 and 1512, thereby being selectively disposed on the front surface or rear surface of the mobile terminal 100 according to the moving direction D1/D2 of the second frame 102. According to the selective disposition of the third region 1513, as illustrated in FIG. 4(b), the second rear part 1013 of the first frame 101 is covered by the second and third regions 1512 and 1513 of the display unit 151 and the third rear part 1022 in the first state. Yet, in the second state, as the third region 1513 is moved to the front surface of the mobile terminal 100, the third rear part 1022 is moved in the first direction D1 as well, thereby being possibly exposed out of the mobile terminal 100. Moreover, the second front part 1021 of the second frame 102 is disposed below the first front part 1011 of the first frame 101 in the first state but may be moved out of the first frame 101 in the second state so as to support the third region 1513 of the display unit 151 disposed on the front surface of the mobile terminal 100.

As the first region 1511 and the second region 1512 are always disposed on the front surface and the rear surface of the mobile terminal 100, respectively, the curvatures of the first and second regions 1511 and 1512 may maintain the flat basic state without variation. Yet, the third region 1513 may be bent or folder by being rolled around the roller 1028 within the second frame 102. When the first state is switched to the second state, the third region 1513 may be enlarged to the front surface of the mobile terminal 100 from the second frame 102 by being rolled around the roller 1028 in a predetermined direction. On the contrary, when the second state is switched to the first state, the third region 1513 may be contracted into the second frame 102 from the front surface of the mobile terminal 100 by being rolled around the roller 1028 in a reverse direction and return to the rear surface of the mobile terminal 100 from the second frame 102 simultaneously. Since only a specific portion of a foldable mobile terminal unfolded like a book is folded repeatedly, the specific portion is vulnerable to breakage. On the other hand, a deformed portion of the flexible display unit 151, i.e., the portion rolled around the roller 1028 is variable according to the first or second state of the mobile terminal 100, i.e., the movement of the second frame 102. Therefore, the mobile terminal 100 of the present disclosure may considerably reduce the deformation and fatigue applied repeatedly to the specific portion of the display unit 151, thereby preventing the breakage or damage of the display unit 151.

Based on the aforementioned configuration, the overall operation of the mobile terminal 100 is described as follows. For example, a state switching may be performed manually by a user, and an operation of the mobile terminal 100 during the manual state switching is described. Yet, operations of the first to third frames 101 to 103 and the display unit 151 may be identically performed in case of using a power source other than a user's force, i.e., in case of applying the driving unit 200 described later.

As illustrated in FIG. 3(a), FIG. 4(a) and FIG. 5(a), in the first state, the second frame 102 is fully contracted or retracted into the first frame 101. Therefore, only the first region 1511 of the display unit 151 fixed to the front surface of the first frame 101 may be exposed on the front surface of the mobile terminal 100. The first region 1511 may be fixed to and supported by the first frame 101, i.e., the first front part 1011 thereof. The third region 1513 may be disposed on the rear surface of the mobile terminal 100 together with the second region 1512 mostly and disposed within the second frame 102 in a state of being rolled around the roller 1028 in part. The third region 1513 of the rear surface of the mobile terminal 100 may be supported by the second frame, i.e., the third rear part 1022 1022 thereof. The second region 1512 may be fixed by the third frame 103 disposed on the second frame 1022 (i.e., the third rear part 1022) and movably coupled to the second frame 102.

In such a first state, if the second frame 102 is moved in the first direction D1, the mobile terminal 100 may switch to the second state. As illustrated in FIG. 3(b), FIG. 4(b) and FIG. 5(b), the second frame 102 is extended from the first frame 101 by the movement in the first direction D1 and may increase an overall size of the mobile terminal 100, and more particularly, the front surface thereof. During the movement in the first direction D1, the second frame 102 may apply a force, i.e., tension to the display unit 151 in the first direction D1. As the display unit 151 is fixed to the first frame 101 but movably coupled to the second frame 102 using the third frame 103, the third region 1513 may be rolled out of the roller 1028 of the second frame 102 to the front surface of the mobile terminal 100 by the force applied by the second fame 102. Namely, the third region 1513 may be withdrawn (or pulled out), extend or move out from the second frame 102. Simultaneously, a portion disposed on the third region 1513, and more particularly, on the rear surface of the mobile terminal 100 may be rolled into the roller 1028 of the second frame 102 or inserted (or pushed), retracted or moved in the second frame 102. The third region 1513 is not fully withdrawn from the second frame 102 to the front surface of the mobile terminal 100, and a portion of the third region 1513 may be disposed in the second frame 102 in a state of being still rolled around the roller 1028. Moreover, for such a smooth movement of the third region 1513, the second region 1512 may move in the first direction D1 against the second frame 102 together with the third frame 103. Moreover, as described above, the second region 1512 and the third frame 103 may relatively move in the first direction D1 against the first frame 101 together with the second frame 102 by being restrained by the second frame 102. Therefore, the second region 1512 and the third frame 103 may move relatively in the first direction D1 not only for the second frame 102 but also for the first frame 101, thereby being capable of moving a distance longer than a moving distance of the second frame 102. Therefore, for the long movement of the second region 1512 in the first direction D1, the third region 1513 may be smoothly extended to the front surface of the mobile terminal 100. For the movement of the third region 1513 in proportion to the extension of the second frame 102, the movement of the second region 1512 and the third frame 103 in the first direction D1 may be performed simultaneously with the movement of the third region 1512 and the second frame 102 in the first direction D1 so as to be proportional to the movement of the third region 1513 and the second frame 102.

Once the second frame 102 is fully extended in the first direction D1, the first and third regions 1511 and 1513 are disposed on the front surface of the mobile terminal 100 and only the second region 1512 may be disposed on the rear surface of the mobile terminal 100. The first and third regions 1511 and 1513 may be supported by the first frame (i.e., the first front part 1011 thereof) and the second frame (i.e., the second front part 1021 thereof). As the second frame 102, i.e., the third rear part 1033 thereof is extended in the first direction D1, they may expose the second rear part 1013 of the first frame 101 support the moving third region 1513. Therefore, in the second state, the mobile terminal 100 may have the enlarged front display unit 151.

On the other hand, if the second frame 102 is moved in the second direction D2 in the second state, the mobile terminal 100 may return to the first state as illustrated in FIG. 3(a), FIG. 4(a) and FIG. 5(a). The second frame 102 is retracted into the first frame 101 by the movement in the second direction D2, thereby reducing the overall size of the mobile terminal 100, and particularly, the front surface thereof. The movement of the display unit 151 during the movement of the second frame 102 may be performed in reverse order of the aforementioned movement in the first direction D1. Schematically, the third region 1513 may be rolled into the roller 1028 of the second frame 102 from the front surface of the mobile terminal 100 or inserted/retracted/moved in the second frame 102. Simultaneously, the third region 1513 may be rolled out of the roller 1028 of the second frame 102 or withdrawn/extended/moved out of the roller 1028 of the second frame 102 to the rear surface of the mobile terminal 100. The third region 1513 is not fully withdrawn from the second frame 102 to the rear surface of the mobile terminal 100, and a portion of the third region 1513 may be disposed in the second frame 102 in a state of being still rolled around the roller 1028. Moreover, for such a smooth movement of the third region 1513, the second region 1512 may move in the second direction D2 against the second frame 102 together with the third frame 103, and the second region 1512 and the third frame 103 may relatively move in the second direction D2 against the first frame 101 together with the second frame 102 by being restrained by the second frame 102. Therefore, the second region 1512 and the third frame 103 may move relatively in the second direction D2 not only for the second frame 102 but also for the first frame 101, thereby being capable of moving a distance longer than a moving distance of the second frame 102. For the long movement of the second region 1512, the third region 1513 may smoothly return to the rear surface of the mobile terminal 100. Moreover, for the movement of the third region 1513 in proportion to the retraction of the second frame 102, the movement of the second region 1512 and the third frame 103 in the second direction D2 may be performed simultaneously with the movement of the third region 1512 and the second frame 102 in the second direction D2 so as to be proportional to the movement of the third region 1513 and the second frame 102. If the second frame 102 is fully retracted in the second direction D2, the mobile terminal 100 may switch to the first state mentioned in the foregoing description and have the front display unit 151, which is relatively reduced smaller than that the second state, in the first state.

Figure 6:
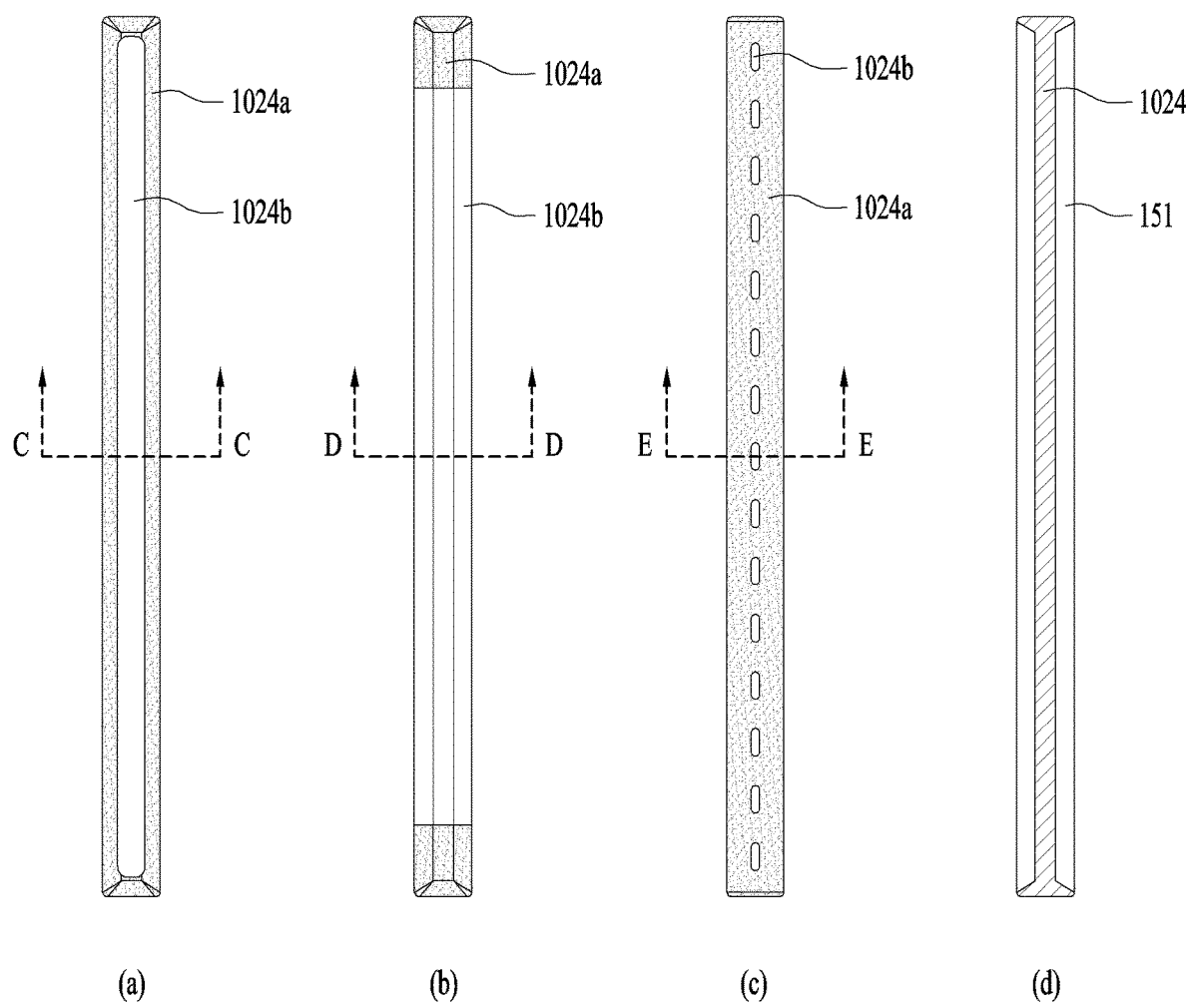
FIG. 6 is a view illustrating various embodiments of a side frame of the mobile terminal.

Meanwhile, in the mobile terminal 100 according to the preset disclosure, the side frame 1024 may have various configurations to perform various functions. FIG. 6 is a view illustrating various embodiments of a side frame of a mobile terminal, and FIG. 7 is a sectional view illustrating side frames and adjacent components, obtained along the cutting lines C-C, D-D and E-E of FIG. 6, respectively. The side frame 1024 and the components adjacent thereto are described in detail with reference to the accompanying drawings as follows.

First of all, the side frame 1024 may include a non-transparent or transparent material or be configured in a manner of mixing a non-transparent and a transparent material together. As illustrated in FIG. 6(a), the side frame 1024 includes a transparent part 1024b in the middle of a non-transparent part 1024a, thereby forming a window through which the display unit 151 rolled around the roller 1038 1038 is exposed. As illustrated in FIG. 6(b), the side frame 1024 has a further enlarged region of a transparent part 1024b, thereby enlarging the exposed display unit 151. Through the transparent part 1024b, an image or text outputted from the flexible display unit 151 is viewable.

A user input may be performed on a lateral side using a touch sensor of the flexible display unit 151. For a touch input, the side frame 1024 may include a conductive material. By forming a protrusion at a conductive material contained portion, a user may touch the protrusion to input a user command.

An inner side of the side frame 1024 corresponding to a curvature of the flexible display unit 151 rolled around the roller 1028 is formed to have a thicker middle portion, thereby securing rigidity with a natural curved surface.

As illustrated in FIG. 6(c), a transparent part 1024b of a predetermined pattern is configured, thereby providing a user with notification by driving the flexible display unit 151. For example, if there is an incoming call, the flexible display unit 151 may be driven to emit light sequentially.

If there is a notification push of a message or application, notification may be provided in a manner of projecting a light in specific color from the flexible display unit 151 rolled around the roller 1028. Therefore, notification may be provided to a user using the flexible display unit 151 without the separate optical output unit 154. In this case, the transparent part 1024b may obtain an effect of spreading light delicately using a semi-transparent material instead of a fully-transparent material.

As illustrated in FIG. 6(d), a terminal may be implemented in a manner that a thickness-directional width of a region of a side frame 1024 is narrowed to provide an edge region extended to a predetermined region in a lateral direction to an end of the display unit 151.

The side frame 1024 prevents a breakage problem caused when a face of the flexible display unit 151 folded by an out-folding scheme is exposed externally, whereby durability of the mobile terminal 100 may be enhanced.

FIG. 7 illustrates configurations of the roller 1028 and the flexible display unit 151 as well as the side frame 1024. The flexible display unit 151 of the preset disclosure may include a display panel 151b outputting a video and a back plate 151c supporting a rear surface of the display panel 151b.

The display panel 151b is a flexible video display device and may include an Organic Light Emitting Diode (OLED). The back plate 151c may use a metal plate provided to the rear surface of the display panel 151 with rigidity to support the display panel 151b. If the display panel 151b is bent, the metal plate may be bent together with the display panel 151b.

The back plate 151c and the display panel 151b may be attached to each other using an adhesive member. And, the adhesive member may use a double-sided tape such as OCA flexible within a predetermined range like a foam material. Hence, the adhesive member can offset the slip effect due to a curvature radius difference between the back plate 151c and the display panel 151b.

In order to achieve the natural folding when the third region 1513 is deformed, a groove elongated in the third direction, i.e., the length direction of the mobile terminal 100 may be formed on a surface of a region of the back plate 151c corresponding to the third region 1513. Namely, such a groove may be elongated in a straight line between top and bottom ends of the back plate 151c.

Although the back plate 151c has the rigidity, it is unable to completely prevent the droop of the display unit 151. Hence, the display unit 151 may further include a support frame 300 located on a region corresponding to the third region 1513 thereof.

The support frame 300 may include a plurality of support bars 310 elongated in the third direction, i.e., the length direction of the mobile terminal 100. The support bar 310 may be continuously elongated between the top and bottom ends of the display unit 151. The support bars 310 may be spaced apart from each other in a predetermined distance along the length direction of the display unit 151. As the support bars 310 are not formed wide, they may support the rear surface of the flexible display unit 151 without interrupting the bending deformation of the flexible display unit 151. Particularly, in order to avoid the interference between the support bars 310 in case of folding the display unit 151, each of the support bars 310 may have a trapezoidal or trigonal cross-section so that a size of a portion attached to the back plate 151c is smaller than that of an opposite side.

The support bar 310 may be formed by plastic injection molding. If necessary, as illustrated in FIG. 7(b), the rigidity of the support frame 300 may be reinforced by embedding a rigid bar 320 of a metal material in the support bar 310.

The thickness of the support frame 300 may be formed to correspond to that of the first front part 1011 of the first frame 101. As illustrated in FIG. 5(b), the second front part 1021 used to be located inside the first front part 1011 in the first state is located on the rear surface of the third region 1513 of the flexible display unit 151 in the second state. Since a separation space amounting to the thickness of the first front part 1011 is formed between the second front part 1021 and the display unit 151, i.e., the back plate 151c, it causes a problem that the third region 1513 of the flexible display unit 151 droops.

The support frame 300 fills the separation space between the second front part 1021 and the display unit 151, i.e., the back plate 151c and supports the third region 1513 of the flexible display unit 151. Preferably, the thickness of the support frame 230 may have the thickness corresponding to the separation space between the second front part 1021 and the back plate 151c, i.e., the thickness of the first front part 1011. Moreover, as illustrated in FIG. 5(a), a separation due to the thickness of the third frame 103 may be generated between the second frame, i.e., the third rear part 1022 thereof and the display unit 151. The support frame 300 may fill such separation as well, thereby supporting the third region 1513 more stably. To perform such a function, as described above, the support frame may be provided to the third region 1513, and more particularly, to the rear surface of the third region 1513 only.

In case that the support frame 300 has sufficient rigidity, the second front part 1021 of the second frame 102 may be skipped. In this case, the corresponding thickness may be set irrespective of the first front part 1011 of the first frame 101.

The roller 1028 may have various structures to enable the flexible display unit 151 to be rolled around the roller 1028 by contacting with a surface of the support frame 200 without being moved back. For example, as illustrated in FIG. 7(b), the roller 1028 may include a gear disposed on a circumferential surface thereof and engaged between the support bars 310. On the other hand, as illustrated in FIG. 7(c), a first sawtooth may be formed on a surface of the roller 1028 and a second sawtooth 310a engaging with the first sawtooth 1028a may be formed on a surface of the support frame 300 as well.

As illustrated in FIGS. 7(a) to 7(c), a rear cover 104 covering the rear surface of the mobile terminal 100 may be further included. As at least one portion of the rear cover 104 is transparent, a video outputted from the flexible display unit 151 located on the rear surface can be checked. A portion of the rear cover 104 covering the first rear part 1012 may be formed transparent to correspond to the camera 121, the flash and the like at least.

The rear cover 104 may be coupled to the first frame 101 and cover it substantially by being directly coupled on the first rear part 1012. The rear cover 104 may not be coupled to the third rear part 1022 of the second frame 102, the third frame 103 and the flexible display unit 151 but may simply cover them. To this end, the rear cover 104 may be spaced apart from the second rear part 1013 by the total thickness of the third rear part 1022 of the second frame 102, the third frame 103 and the flexible display unit 151. In order not to interrupt the movement of the flexible display unit 151 and to prevent the breakage of the display unit 151, the rear cover 104 may be configured not to contact with the display unit 151. If the mobile terminal 100 is in the first state, the rear cover 104 may cover the flexible display unit 151. If the mobile terminal 100 is in the second state, the rear cover 104 may cover and protect the second rear part 1013 exposed by the movement of the flexible display unit 151 and the third rear part 1022.

The rear cover 104 may be coupled to the second frame 102. In this case, in the first state, the rear cover 104 may cover the entire rear surface of the mobile terminal 100, i.e., the first rear part 1012 and the display unit 151. In the second state, the rear cover 104 moves together with the second frame 102 and may cover the third rear part 1022 of the second frame 102 exposed by the movement of the display unit 151 and the second region 1512 of the flexible display unit 151 coupled to the third frame 103.

Meanwhile, when the flexible display unit 151 is enlarged in a manner that a user manually moves the second frame 102, the flexible display unit 151 may be twisted or the first or second frame 101 or 102 may be broken or damaged due to a force applied non-uniformly. Therefore, the mobile terminal 100 of the present disclosure may include a driving unit 200 configured to uniformly apply a force to the second frame 102 for movement. The driving unit 200 may move the second frame 102 in a manner of applying a force to the second frame 102 automatically according to a user's instruction or a predetermined condition.

Figure 8:
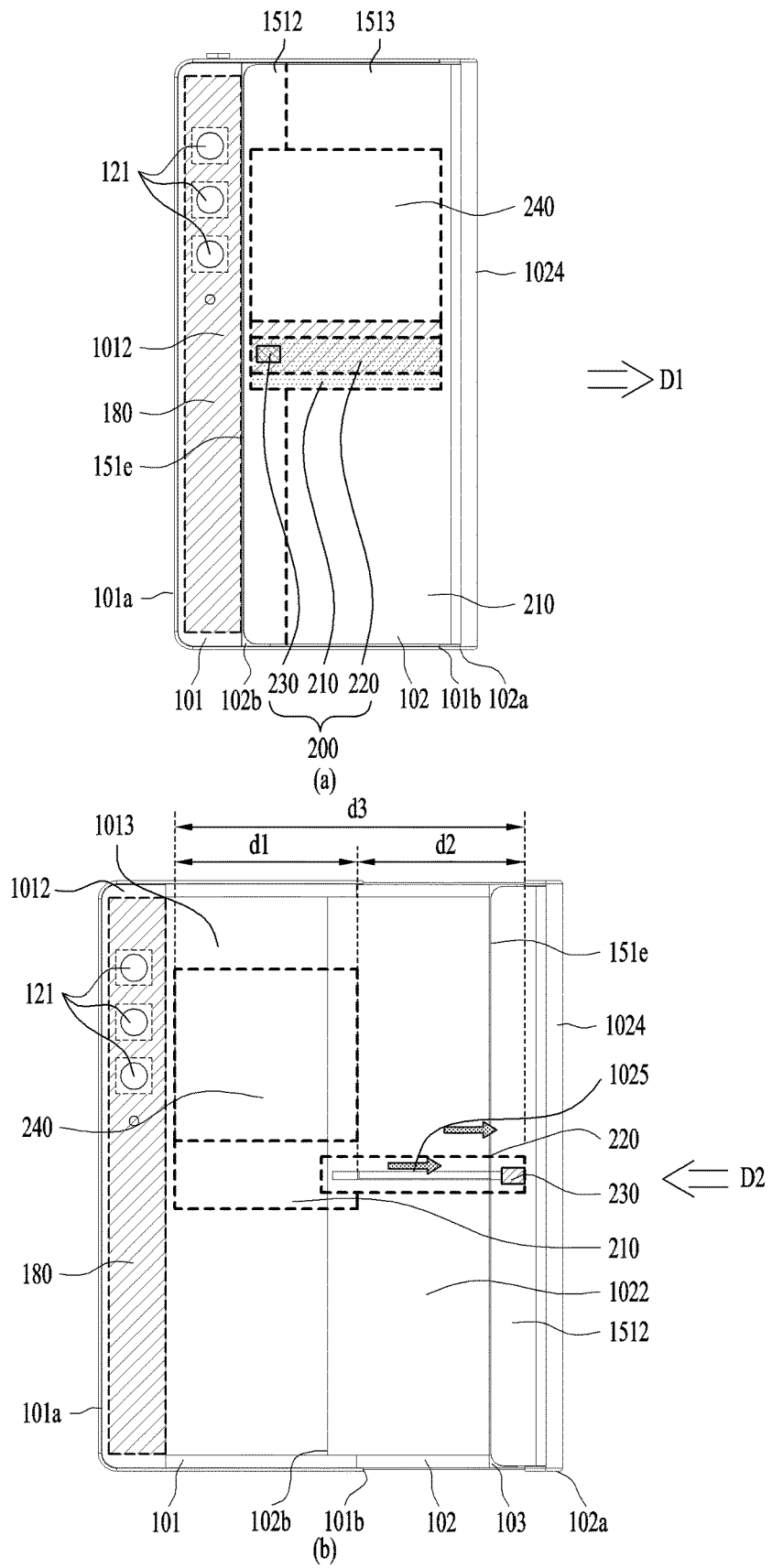
FIG. 8 is a rear view illustrating an operation of a driving unit and the first and second states of the mobile terminal achieved by the operation.

The driving unit 200 is described in detail with reference to the relevant drawing as follows. FIG. 8 is a rear view illustrating an operation of a driving unit and first and second states of a mobile terminal implemented by the operation. An operation principle of the driving unit 200 is described first with reference to FIG. 8.

The driving unit 200 may be configured to move the second frame 102 relatively to the first frame 101 or move the third frame 103 relatively to the second frame 102. In particular, the driving unit 200 may move the second frame 102 in the first direction D1 against the first frame 101 and move the third frame 103 in the first direction D1 against the second frame 102. By the movement in the first direction D1, as described above, the mobile terminal 100 is switched to the second state from the first state. And, by the movement of the display unit 151 to the front surface of the mobile terminal 100, the mobile terminal 100 may secure an enlarged front display region. Alternatively, the driving unit 200 may move the second frame 102 in the second direction D2 opposite to the first direction D1 against the first frame and move the third frame 103 in the same second direction D2. By the movement in the second direction D2, as described above, the mobile terminal 100 is switched to the first state from the second state. And, by the movement of the display unit 151 to the rear surface of the mobile terminal 100, the mobile terminal 100 may return to have a reduced front display region. Besides such basic movements, the driving unit 200 may be configured to perform all movements of the second and third frames 102 and 103 and the display unit 151 linked to them, which are required for the aforementioned state switching of the mobile terminal 100.

As schematically illustrated in FIG. 8, in order for the mobile terminal 100 to enter the second state, the second frame 102 may be moved in the first direction D1 by a first distance d1 preset for the first frame 101. Since the third frame 103, i.e., the second region 1512 is coupled to the second frame 102, it may basically move in the first direction D1 by the first distance d1 against the first frame 101 together with the second frame 102. By such a movement of the second frame 102, the front surface of the mobile terminal 100 may be extended in the first direction D1 by a second distance d2 equal to the first distance d1. Hence, in order to move the display unit 151, and particularly, the third region 1513 to the front surface of the mobile terminal 100 by the extended second distance d2, as illustrated in the drawing, the third frame 103 should further move in the first direction D1 against the second frame by the second distance d2 equal to the first distance d1 additionally. Hence, the display unit 151, i.e., the third frame 103 may move in the first direction D1 by a third distance d3 amounting to a double of the first distance d1 that is the moving distance of the second frame 102. On the other hand, in order to make the mobile terminal 100 to return to the first state, the second and third frames 102 and 103 may move in a manner opposite to the former description. Schematically, the second frame 102 moves in the second direction D2 against the first frame 101 by the first distance d1, and the third frame 103 may move in the second direction D2 against the second frame 102 by the second distance d2 in addition to the movement by the first distance d1 against the first frame 101. Hence, for the switching to the first state, the display unit 151, i.e., the third frame 103 may move in the second direction D1 by the third distance d3 amounting to the double of the first distance d1 that is the moving distance of the second frame 102. For that reason, the driving unit 200 may be configured to move the third frame 103 against the first frame 101 as well as the second frame 102, thereby moving the third frame 103 by the aforementioned long distance, i.e., the third distance d3.

While the front surface of the mobile terminal 100 is increased or decreased by the movement of the second frame 102, if the display unit 151 fails to move in proportion to such increase or decrease of the front surface, the enlargement or reduction of the display unit 151 on the front surface of the mobile terminal 100 may not be smoothly performed. For that reason, the driving unit 200 may be configured to synchronize the movement, i.e., slide of the third frame 103 with the movement, i.e., slide of the second frame 102. Particularly, the driving unit 200 may be configured to synchronize a timing of starting the movement of the third frame 103 with a timing of starting the movement of the second frame 102. Namely, the driving unit 200 may be configured to make the third and second frames 103 and 102 start to move simultaneously. The simultaneous movements of the second and third frames 102 and 103 may start at the same location on the mobile terminal 100. Namely, the driving unit 200 may synchronize a location of starting the movement of the third frame 103 with a location of starting the movement of the second frame 102. Together with the synchronizations of the movement start timing and the movement start locations, the driving unit 200 may be configured to synchronize a moving speed of the third frame 103 with a moving speed of the second frame 102. Hence, the driving unit 200 may simultaneously move the second and third frames 102 and 103 from the same location within the same time by the same distance (i.e., the first distance d1 against the first frame 101 in case of the second frame 102, the second distance d2 against the first frame 102 in case of the third frame 103) against the first and second frames 101 and 102, respectively. Moreover, since the third frame 103 basically moves by the first distance d1 by being carried by the second frame 102, it may move long owing to the above-synchronized movement by the third distance d3 amounting to the sum of the first and second distances d1 and d2 overall by moving in proportion to the moving distance of the second frame 102. For that reason, by the driving unit 200, according to the increase/decrease of the front surface of the mobile terminal 100, the display unit 151 may be smoothly enlarged/reduced on the front surface.

The driving unit 200 is configured to satisfy such requirements. As schematically illustrated in FIG. 8. The driving unit 200 may include a support 210, a first actuator 220 movably coupled to the support 210, and a second actuator 230 movably coupled to the first actuator 220. The first actuator 220 reciprocates on a straight line in predetermined directions, i.e., the first and second directions D1 and D2 against the support 210 and may be configured to move the second frame 102. And, the second actuator 230 reciprocates on a straight line in the first and second directions D1 and D2 against the first actuator 220 and may be configured to move the third frame 103. Namely, the driving unit 200 has the telescopic structure that includes the straight-lined reciprocating first and second actuators 220 and 230 as stages. Through the telescopic structure, the driving unit 200 may be configured to achieve the required moving distances of the second and third frames 102 and 103. Moreover, the driving unit 200 may be configured to synchronize the movement of the first actuator 220 and the movement of the second actuator 230 together for the synchronization of the movements of the second and third frames 102 and 103. The first and second actuators 220 and 230 of the driving unit 200 provide power to the frames 102 and 103 by linking to the second and third frames 102 and 103 and may perform the movements required for the frames 102 and 103 identically for the aforementioned state switching of the mobile terminal 100. Configurations and operations of the parts of the driving unit 200 are described in detail.

As illustrated in FIG. 2 and FIG. 8, the driving unit is configured as a compact module and may be appropriately installed in a limited inner space within the mobile terminal 100. Since the driving unit 200 is configured to move the second and third frames 102 and 103, it may be installed at the first frame 101 that is relatively stationary against the frames 102 and 103. Particularly, a predetermined seat 1013a is formed in the second rear part 1013 of the first frame 101 adjacent to the second and third frames 102 and 103. The seat 1013a may be configured to be open to or communicate with the second and third frames 102 and 103. The driving unit 200 is installed in the seat 1013a, and the first and second actuators 220 and 230 thereof may be coupled to the second and third frames 102 and 103 to move, respectively.

Figure 9:
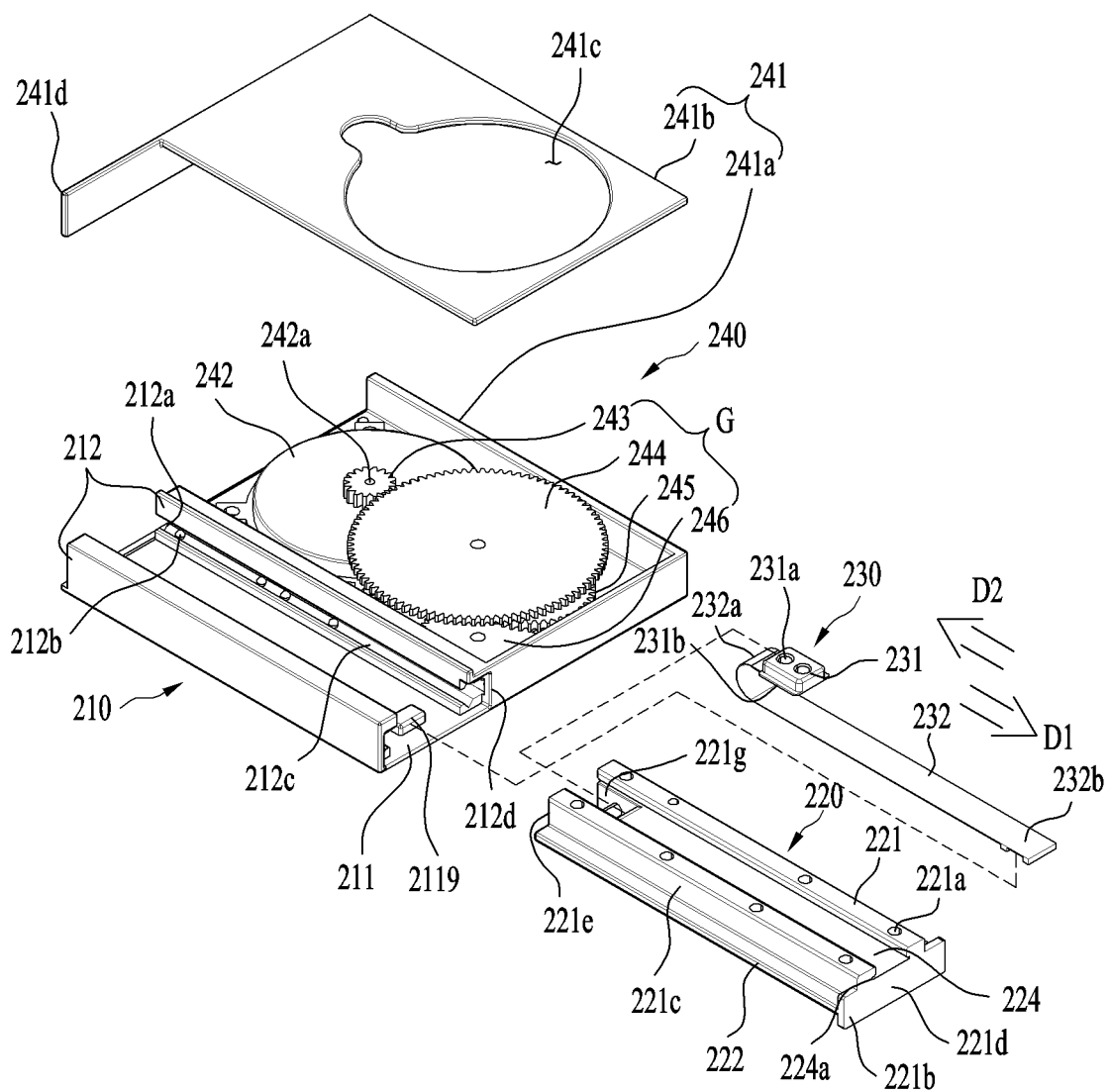
FIG. 9 is an exploded perspective view illustrating a driving unit of the mobile terminal according to the present disclosure.
Figure 10:
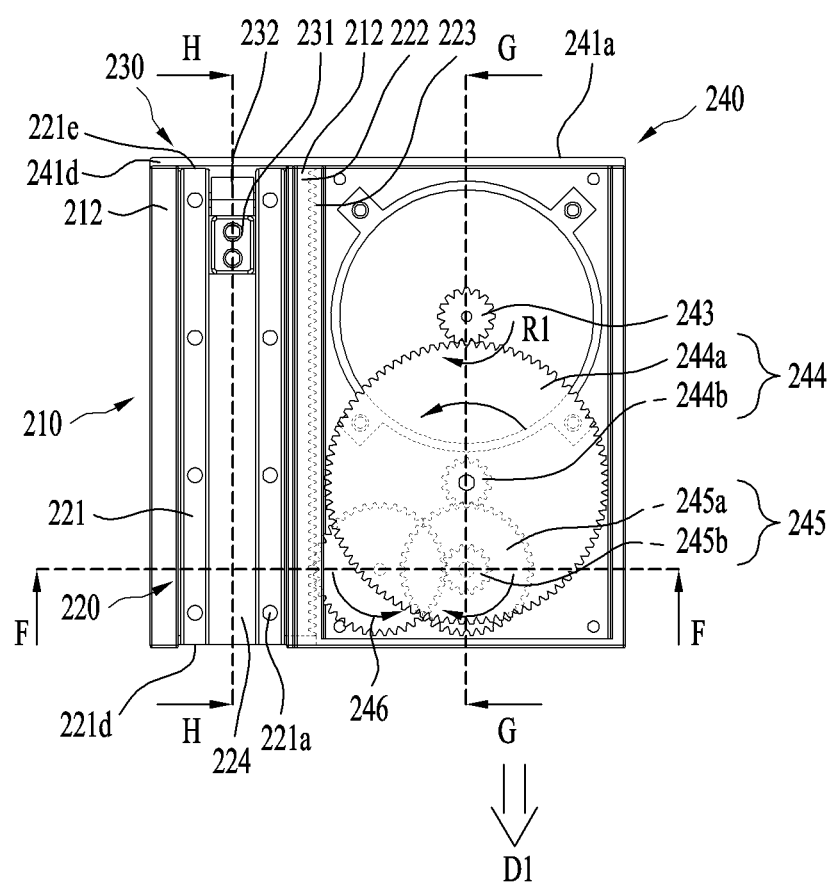
FIG. 10 is a plan view illustrating the driving unit in the first state.
Figure 11:
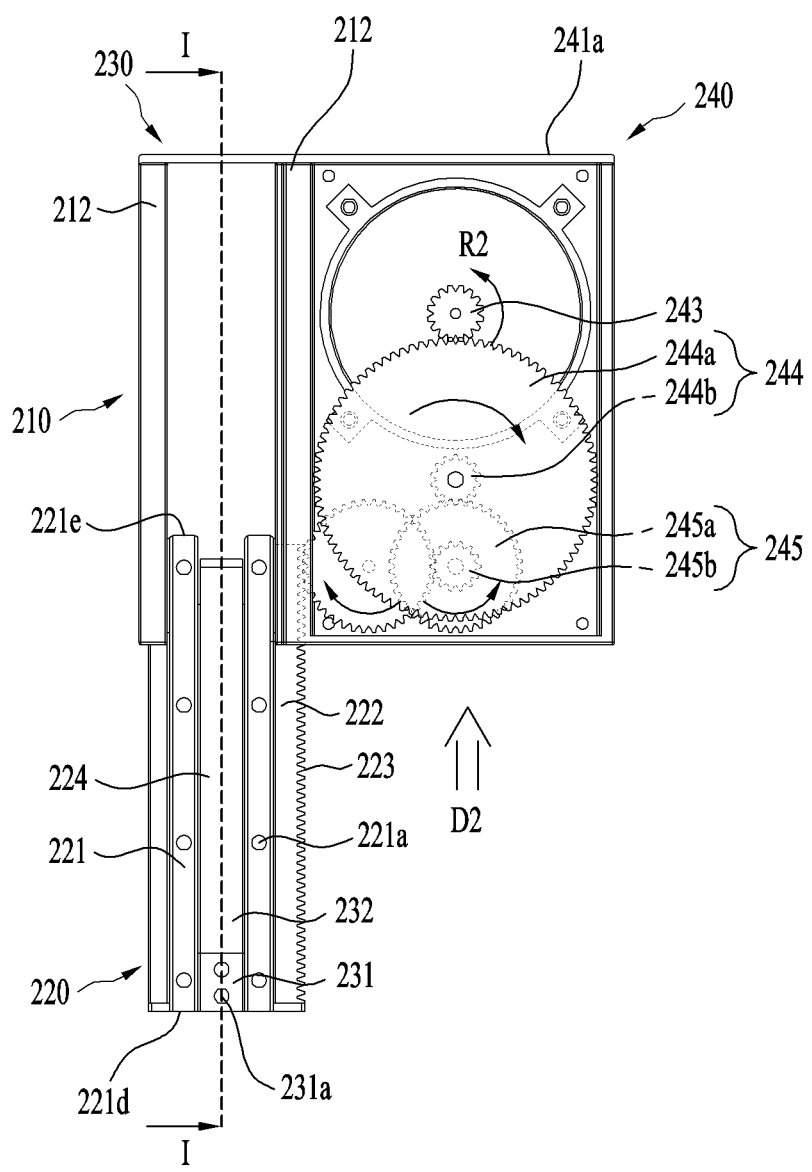
FIG. 11 is a plan view illustrating the driving unit in the second state.
Figure 12:
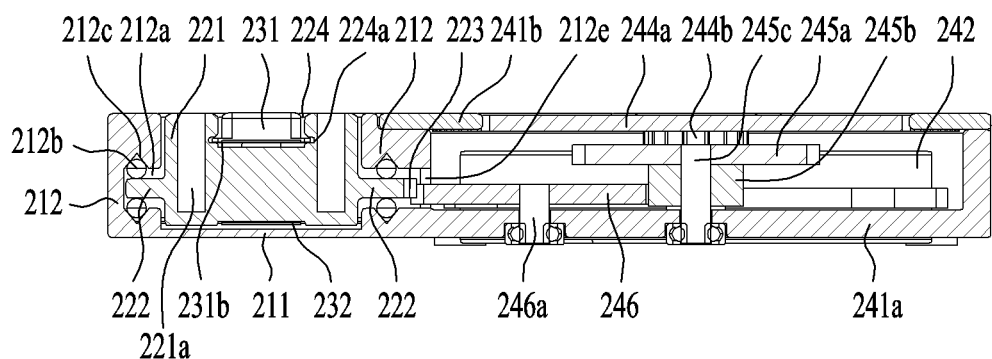
FIG. 12 is a sectional view illustrating the driving unit, taken along line F-F of FIG. 10.
Figure 13:
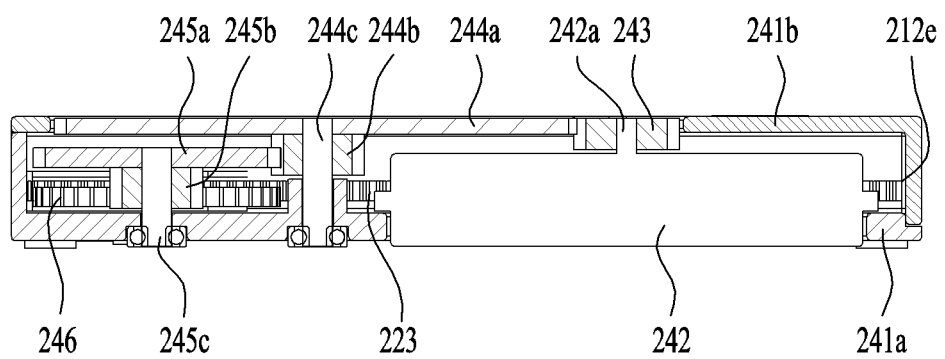
FIG. 13 is a sectional view illustrating the driving unit, taken along line G-G of FIG. 10.
Figure 14:
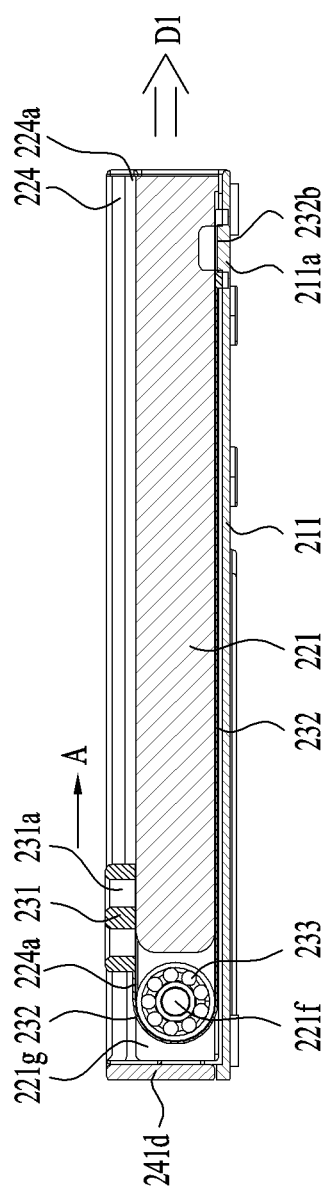
FIG. 14 is a side sectional view illustrating the driving unit in the first state illustrated in FIG. 10, taken along line H-H.
Figure 15:
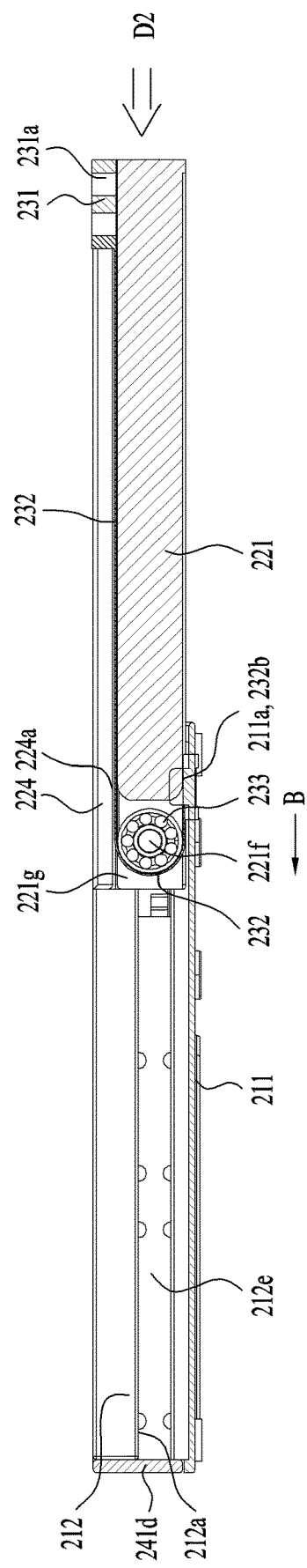
FIG. 15 is a side sectional view illustrating the driving unit in the second state, taken along line I-I of FIG. 11.

The above schematic description will be followed by a detailed description of the driving unit 200 with reference to related drawings. FIG. 9 is an exploded perspective view illustrating the driving unit of the mobile terminal according to the present disclosure, FIG. 10 is a plan view illustrating the driving unit in the first state, FIG. 11 is a plan view illustrating the driving unit in the second state, FIG. 12 is a sectional view illustrating the driving unit, taken along line F-F of FIG. 10, FIG. 13 is a sectional view illustrating the driving unit, taken along line G-G of FIG. 10, FIG. 14 is a side sectional view illustrating the driving unit in the first state, taken along line H-H of FIG. 10, and FIG. 15 is a side sectional view illustrating the driving unit in the second state, taken along line I-I of FIG. 11.

Figure 16:
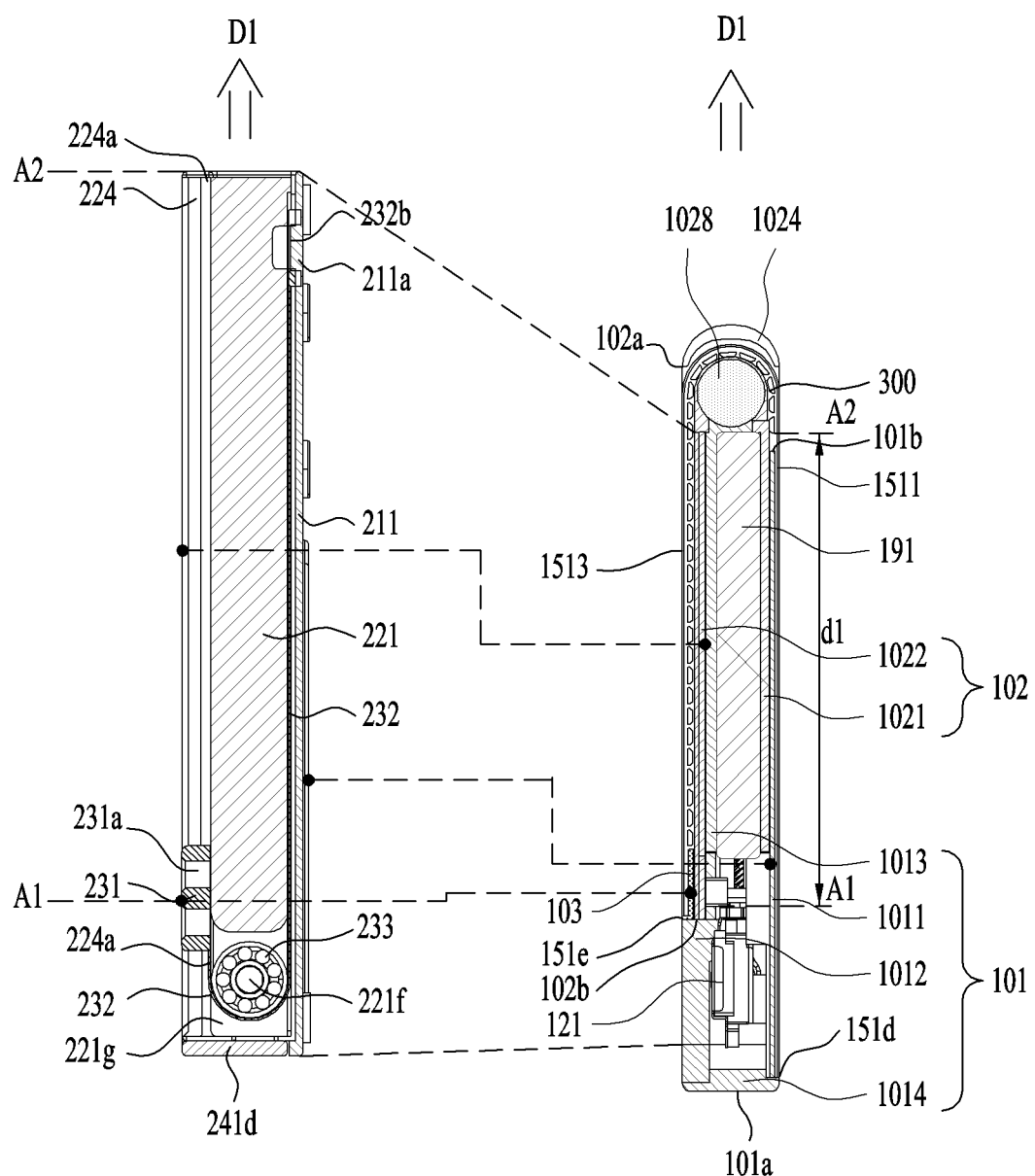
FIG. 16 is a side sectional view illustrating the states of first to third frames under the action of the driving unit in the first state.
Figure 17:
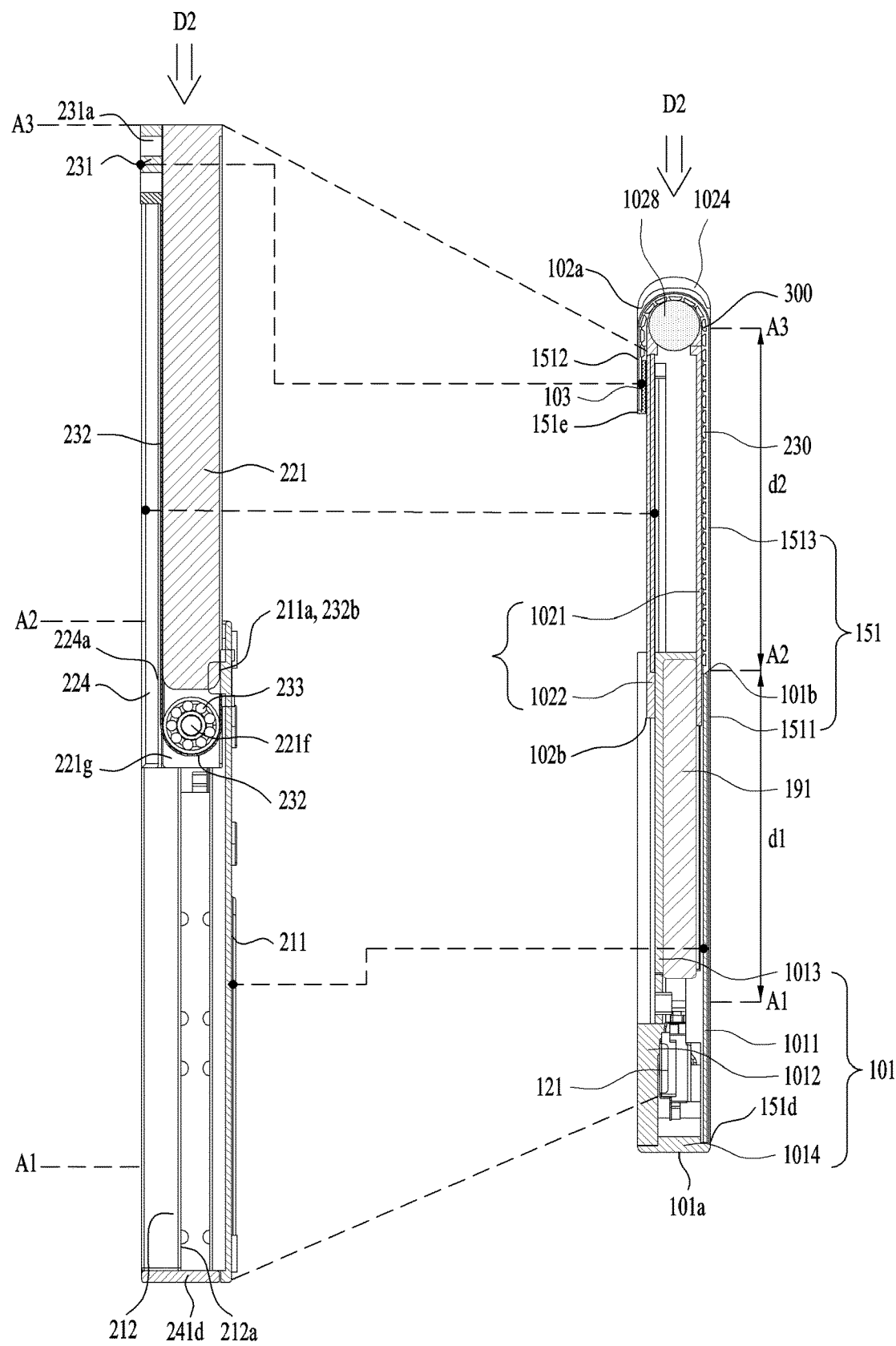
FIG. 17 is a side sectional view illustrating the states of the first to third frames under the action of the driving unit in the second state.

FIGS. 9 to 15 illustrate the rear surface of the driving unit 200, that is, a coupling part with the second and third frames 102 and 103, for more accurate understanding of the structure of the driving unit 200. However, when the mobile terminal 100 is viewed from the front, the driving unit 200 is actually disposed in the opposite state to that illustrated in FIGS. 9 to 15, that is, in an inside out state, as illustrated in FIGS. 16 and 17. Additionally, a part of the driving unit 200, that is, a cover 241b is shown as removed in FIGS. 10 and 11 to better illustrate the internal structure of the driving unit 200, more precisely, the internal structure of a power source 240 to be described later.

Referring to FIGS. 9 to 15 together, the driving unit 200 may include the support 210 configured to support movable components, that is, the first and second actuators 210 and 220. The support 210 may include a base 211. The base 211 may be formed into a plate-shaped member that is narrow and elongated to be installed in the limited internal space of the mobile terminal 100, as illustrated. Although the base 211 may be configured to directly support movable components, particularly the first actuator 210, the support 210 may include a sidewall 212, for stable support. The sidewall 212 may extend perpendicularly to the base 211, and may also be elongated in the length direction of the base 211. Additionally, the side wall 212 may be coupled to a side portion of the base 211. The side wall 212 may be configured to face a side portion of the first actuator 210 and accordingly, support movement of the first actuator 210 in the length direction of the support 210, that is, a linear reciprocating movement of the first actuator 210 in the first and second directions D1 and D2. To stably support the first actuator 210, the sidewall 212 may contact the side portion of the first actuator 210. Additionally, the support 210 may include an additional sidewall 212, for more stable support. That is, the support 210 may include a pair of sidewalls 212 extending vertically from side portions of the base 211, apart from each other by a predetermined distance. Accordingly, the support 210 may have a structurally stable channel structure. The pair of sidewalls 212 may stably support the movement of the first actuator 220, facing both side portions of the first actuator 220, respectively.

The support 210 may be configured to be kept in a stationary state, for relative movements of the first and second actuators 220 and 230, and accordingly, may be fixed to the first frame 101 stationary relative to the second and third frames 102 and 103 in the mobile terminal 100. More specifically, as illustrated in FIG. 2, the support 210 may be inserted into the seat 1013a of the second rear part 1013, together with the first and second actuators 220 and 230, and the base 211 may be coupled with the rear surface of the first front part 1011 adjacent thereto. The base 211 may include a fastening hole, and may be fixed to the first frame, precisely, to the first front part 1011 by a fastening member and the fastening hole. Additionally, the support 210, that is, the base 211 and sidewalls 212 thereof may be oriented in the lateral direction (i.e., the first and second directions D1 and D2) of the mobile terminal and elongated in the lateral direction in order to properly support the first and second actuators 220 and 230 moving in the first and second directions D1 and D2.

Additionally, the driving unit 200 may include the first actuator 220 movably coupled to the support 210. The first actuator 220 is configured to move in the first or second direction D1 or D2 against the support 210. Additionally, to smoothly move in the first or second direction D1 or D2 while being supported by the support 210, the first actuator 220 may be oriented in the lateral direction (i.e., the first and second directions D1 and D2) of the mobile terminal. By this movement, the first actuator 220 may be extended from the support 210 or retracted to the support 210 by a predetermined length. Additionally, the first actuator 220 may be coupled to the second frame 102 and move the second frame 102 in the first or second direction D1 or D2. Like the slide movement of the second frame 102, the movement of the first actuator 220 may also correspond to a slide movement against the support 210.

The first actuator 220 may include a thruster 221 configured to thrust the second frame 102 in the first or second direction D1 or D2 by received power. For stable thrusting, the thruster 221 may be movably coupled to the support 210 and supported during movement by the support 210. Although the thruster 221 may be coupled to various portions of the support 211, the thruster 221 may be accommodated in the support 211 to be supported by the sidewalls 212 and/or the base 211 of the support 211. More specifically, the thruster 221 is movably coupled to the support 210, precisely the sidewalls 212 of the support 210, thereby making the first actuator 220 movable against the support 210 as a whole. For this coupling, the thruster 221 may include a sidewall 221c. The sidewall 221c may be oriented perpendicularly to the base 211 of the support 210 and parallel to the sidewalls 212 of the support 210. Additionally, the sidewall 221c may also be elongated along the sidewalls 212 of the support 210. Accordingly, the sidewall 221c may be supported by a sidewall 212 of the support 210 and move along the sidewall 212. For more stable support, the sidewall 221c may contact the sidewall 212 of the support 210. Additionally, the thruster 221 may include a pair of sidewalls 211c apart from each other, and for stable movement of the first actuator 220, these sidewalls 221c may be supported by the sidewalls 212 of the support 210, respectively. The thruster 221 may have an elongated body to have these sidewalls 221c. The body may be in various shapes, for example, a rod as illustrated. More precisely, the thruster 221, that is, its body may be formed into a rail accommodated in the support 210. Additionally, the thruster 221 may have a solid body to have an appropriate strength as illustrated because it moves repeatedly and supports the second frame 102.

The thruster 221 may be accommodated in the support 210, being elongated along the length direction of the support 210, and may be oriented together with the support 210 in the lateral direction of the mobile terminal. By this extension and orientation, the thruster 221 may slide in the first or second direction D1 or D2 against the support 210. The driving unit 200 may include a guide configured to guide the movement of the first actuator 220, that is, the thruster 221 against the support 210. As well illustrated in FIGS. 9 and 12, a flange 222 may be provided as such a guide in the first actuator 220. The flange 222 may protrude from the first actuator 220, precisely the sidewalls 221c of the thruster 221 towards the support 210, precisely the sidewalls 212 of the support 210. Additionally, the flange 222 may be elongated in the length direction of the first actuator 220, that is, the thruster 221. Additionally, recesses 212a may be provided as guides in the support 210. The recesses 212a may be formed in the support 210, precisely the sidewalls 212 thereof, elongated in the length direction of the support 210. The recesses 212a may accommodate the flange 222, and thus the first actuator 220 may be firmly coupled with the support 210 and move stably. A bearing mechanism may additionally be applied as a guide between the flange 222 and the recesses 212a, as illustrated in FIG. 12. More specifically, retainers 212c may be provided on the surfaces of the recesses 212a facing the flange 222. As illustrated in FIG. 12, the retainers 212c may be formed into grooves, continuously along the length direction of the support 210. Additionally, bearings 212b may be accommodated in the retainers 212c and come into contact with the facing surfaces of the flange 222 in the accommodated state. The bearings 212b may guide sliding movements of the flange 222, and the thruster 221 and the first actuator 220 which are coupled to the flange 222, while rolling along the retainers 212c.

Additionally, the thruster 221 may be configured to be coupled with the second frame 102, and thus the first actuator 220 may move the second frame 102. The thruster 221 may include a fastening hole 221a, and may be coupled to the second frame 102, precisely, the third rear part 1022 of the second frame 102 by a fastening member and the fastening hole 221a, as illustrated well in FIGS. 2, 16, and 17. The fastening hole 221a may be formed on the surface of the thruster 221 facing the second frame 102. More specifically, the fastening hole 221a may be formed on the top surface of the body of the thruster 221 in the drawing, and on the bottom surface of the body of the thruster 221 to face the front surface of the third rear part 1022 of the second frame 102 in the actual orientation of the mobile terminal. Additionally, as described before, the second actuator 230 may be configured to move the third frame 103, and coupled to the third frame 103 through the slot 1025 for this purpose. At the same time, the second actuator 230 moves in synchronization with the first actuator 220. Accordingly, the first actuator 220 may be disposed adjacent to the second actuator 230, for smooth mechanical synchronization between the movements of these actuators 220 and 230. Accordingly, the first actuator 220, that is, the thruster 221 may be disposed adjacent to the slot 102s of the second frame 102 and fastened to a portion of the second frame 102 adjacent to the slot 102s by the fastening hole 221a. The second actuator 230 may also be disposed adjacent to the slot 102s by this coupling of the thruster 221 and easily coupled to the third frame 103 through the slot 102s. The coupling relationship between the second and third frames 102 and 103 and the first and second actuators 220 and 230 will be described later in more detail in relation to the second actuator 230.

For smooth movement of the thruster 221, other components of the mobile terminal may not be arranged in a path in which the thruster 221 moves in the first direction D1 or the second direction D2. Additionally, because the thruster 221 protrudes out of the first frame 101 during movement in the first direction D1 and returns into the support 210 during movement in the second direction D2, the thruster 221 may not interfere with other components actually. However, when moving in the second direction D2 beyond the support 210 and further into the first frame 101, the thruster 221 may interfere with other components in the first frame 101. Therefore, the thruster 221 may include a stopper 221b configured to limit the movement of the thruster 221 in the second direction D2 beyond the support 210, as illustrated in FIG. 9. More specifically, the thruster 221 may include a first end 221d adjacent to the second frame 102, precisely the first side part 102a of the second frame 102 and a second end 221e adjacent to the second side part 102b of the second frame 102. The stopper 221b may be provided on the thruster 221 (i.e., the body thereof), preferably at the first end 221d, and latched by the support 210 when the thruster 221 moves in the second direction D2. The stopper 221b may extend laterally from the body of the thruster 221, preferably, the first end 221d of the thruster 221, for the latching. Therefore, even when excessive power is supplied to the thruster 221, the thruster 221 may not continue to proceed in the second direction D2 beyond the support 210 by the stopper 221b. Further, with continued reference to FIG. 9, the support 210 may include a seat 212d configured to accommodate the stopper 221b to align the thruster 221 with the support 220. The seat 212d may be formed on the base 211 and/or the sidewalls 212 of the support 210. As the stopper 221b is accommodated in the seat 212d during movement of the thruster 221 in the second direction, the thruster 221 may be aligned with the support 210, and then move, more precisely, from the support 210 in the first direction D1.

The first actuator 220 may include the power source 240 configured to supply power for movement of the first actuator 220 in the first and second directions D1 and D2. Because the power source 240 may substantially supply power to the driving unit 200 itself, the driving unit 200 may also be described as including the power source 240. That is, the first actuator 220 and the thruster 221 thereof may be mechanically coupled to the power source 240 outside the driving unit 200. As illustrated, the power source 240 may be disposed adjacent to the first actuator 220 and the support 210 supporting the first actuator 220 so as to be easily coupled to the first actuator 220 and the thruster 221.

The power source 240 may include a housing 241 configured to accommodate components of the power source 240. More specifically, the housing 241 may include a container 241a defining a space for accommodating the components and the cover 241b configured to cover the container 241a, particularly the entrance of the container 241a. The cover 241b may be detachably coupled with the container 241a. Therefore, after the cover 241b is removed, the components of the power source 240 may be easily replaced and repaired. The cover 241b may further include an opening 241c for accommodating components of the power source 240. For example, some 243 and 244 of gears to be described later may be accommodated in the opening 241c. This opening 241c may reduce the size, precisely, the height of the power source 240 by accommodating components of the power source 240 to be exposed to the outside, and thus the power source 240 may become compact enough to be accommodated inside a small mobile terminal. Further, the cover 241b may include an auxiliary stopper 241d configured to limit the movement of the thruster 221 in the second direction D2 beyond the support 210, like the stopper 221b described above. The auxiliary stopper 241d may be configured to close the end of the support 210 adjacent to the first frame 101, precisely the first side part 101a of the first frame 101. That is, the auxiliary stopper 241d may be formed at such an end and close the entrance of the support 210 that allows the movement of the thruster 221. This auxiliary stopper 241d may extend from the body of the cover 241b across the end of the support 210 adjacent to the first frame 101, precisely the first side part 101a of the first frame 101. The auxiliary stopper 241d may prevent the thruster 221 from moving further into the first frame 101 beyond the support 210 during movement of the thruster 221 in the second direction D2, and accordingly, prevent the thruster 221 from interfering with other components in the first frame 101. The housing 241 may be disposed adjacent to the first actuator 220 so that the components accommodated in the housing 241 are easily coupled to the first actuator 220 and the components 221 to 223 of the first actuator 220. More specifically, the housing 241 may be directly attached to the support 210 configured to accommodate the first actuator 220. The housing 241 may also be directly attached to a sidewall 212 of the support 210. Further, the housing 241 may share the sidewall 212 with the support 210 as a sidewall of the container 241a. Alternatively, the components 242 to 246 of the power source 240 may be directly attached to the mobile terminal, specifically to the first frame 101, without the above-described housing 241. In this case, the power source 240 may become more compact.

The power source 240 may further include a motor 242 configured to generate a rotation force. The motor 242 may be disposed in the housing 241. Without the housing 241, the motor 242 may be directly coupled with the first frame 101. The motor 242 may be directly coupled with the first actuator 220, that is, the thruster 221 to supply power to the first actuator 220. Alternatively, the motor 242 may be coupled to the first actuator 220, that is, the thruster 221 through a transmission, for efficient power transmission. The power source 240 may use, as the transmission, a gear train G: 243 to 246 capable of controlling the number of revolutions and magnitude (i.e., torque) of a transmitted rotation force. FIGS. 9 to 11 illustrate an overall configuration of the gear train G, and FIGS. 11 and 12 illustrate a detailed configuration of the gear train G. The gear train G may include a plurality of intermeshing gears 243 to 246. Additionally, the gear train G may be rotatably coupled to the motor 242 and the first actuator 220 (i.e., the thruster 221) by using these gears 243 to 246, respectively, and transfer the power of the motor 242 to the first actuator 220 with an appropriate number of revolutions and magnitude. The gear train G may basically include an input gear 243 configured to receive power and an output gear 246 configured to output adjusted power. Additionally, the gear train G may include a first gear set 244 and a second gear set 245 interposed between the input and output gears 243 and 246 and configured to adjust the number of revolutions and the magnitude of the power. The first and second gear sets 244 and 245 may include a drive gear and a driven gear coupled to one rotation shaft as a kind of compound gear. Although the drive and driven gears have different numbers of teeth, since they are coupled to one rotation shaft, their numbers of revolutions are equal. While the two gear sets 244 and 245 are provided in FIGS. 9 to 12 illustrating an example, additional gear sets may be included when needed.

More specifically, the input gear 243 may be directly coupled to a rotation shaft or driving shaft 242a of the motor 242 and rotated by the motor 242. The first gear set 244 may include a shaft 244c rotatably coupled to the housing 241 or the first frame 101, and a first drive gear 244a and a first driven gear 244b which are coupled to the shaft 244c. The first drive gear 244a has a larger number of teeth than the input gear 243 and the first driven gear 244b, and meshes with the input gear 243. Accordingly, the number of revolutions of the first drive and driven gears 244a and 244b coupled to the same shaft 244c may be less than the number of revolutions of the input gear 243, that is, the number of revolutions of the motor 242. The second gear set 245 may include a shaft 245c rotatably coupled to the housing 241 or the first frame 101, and a second drive gear 245a and a second driven gear 245b which are coupled to the shaft 245c. The second drive gear 245a has a larger number of teeth than the first driven gear 244b and the second driven gear 245b, and meshes with the first driven gear 244b acting as an input gear. Accordingly, the number of revolutions of the second drive and driven gears 245a and 245b coupled to the same shaft 245c may be less than the number of revolutions of the first drive and driven gears 244a and 244b. Finally, the output gear 246 is coupled to a shaft 246a rotatably coupled to the housing 241 or the first frame 101. The output gear 246 has a larger number of teeth than the second driven gear 245b and meshes with the second driven gear 245b acting as an input gear. Accordingly, the number of revolutions of the output gear 246 may be less than the number of revolutions of the second driven gear 245b. The output gear 246 may be engaged with the first actuator 220 (i.e., the thruster 221). As described above, the gear train G may greatly reduce the number of revolutions of the rotation force, that is, the rotational speed of the motor 242 input through the input gear 243 in steps and output rotation power with the appropriately reduced number of revolutions to the first actuator 220 through the output gear 246. Additionally, since the reduced rotational speed and rotation power increase a rotation force (i.e., torque), the gear train G may output the greatly increased rotation force to the first actuator 220 through the output gear 246.

To supply this adjusted power to the first actuator 220 and the thruster 221 thereof, the power source 240 and the first actuator 220 need to be coupled to each other by an appropriate connection mechanism. Accordingly, the first actuator 220 may include a coupler mechanically coupled to the power source 240, as the mechanism. The coupler may be configured to transfer the adjusted power from the power source 240 to the first actuator 220, precisely the thruster 221. The coupler may be configured to couple the power source 240 and the first actuator 220 (i.e., the thruster 221) by using a gear mechanism in order to reduce the loss of transmitted power. Additionally, while the power source 240 provides rotation power, the first actuator 220 (i.e., the thruster 221) needs to reciprocate linearly in the first and second directions D1 and D2. Accordingly, the coupler needs to be configured to transform a rotation movement of the power source 240 into a linear movement. In consideration of these requirements, the coupler may be configured as a rack-pinion mechanism.

More specifically, the coupler may include a rack 223 provided in the first actuator 220 (i.e., the thruster 221). Additionally, the coupler may include a gear (i.e., a pinion) that is provided in the power source 240 and meshes with the rack 223. The rack 223 may be installed at a portion of the thruster 221 adjacent to the power source 240, for example, a side of the thruster 221 adjacent to the power source 240, that is, a side wall 221c. The rack 223 may extend from the sidewall 221c of the thruster 221 toward the adjacent driving unit 240. Because the thruster 221 includes the flange 222 protruding from the sidewalls 221c, for guiding its movement as described before, the rack 223 may be disposed at an end of the flange 222 adjacent to the power source 240. Accordingly, the rack 223 may be easily accessible to the power source 240. Additionally, the rack 223 may be disposed together with the flange 222 in a recess 212a of the support 210 by being provided on the flange 222. The pinion may be the output gear 246 in consideration of the configuration of the gear train G described above. When the motor 242 is directly coupled to the first actuator 220 without the gear train G, the input gear 243 as a pinion may be directly meshed with the rack 233. When the output gear 246 rotates along with the rotation of the motor 242, the rack 233 engaged with the output gear 246 may move linearly. The thruster 221 coupled to the rack 233 may also move the second frame 201, while linearly moving in the same manner. Therefore, to secure a required movement distance of the second frame 201, the rack 233 may have a length corresponding to the movement distance required for the second frame 201. Further, the motor 242 and the output gear 246 may rotate in different directions, and the rack 233 and the thruster 221 may move linearly in the first or second direction D1 or D2, together with the second frame 102 according to the rotation direction.

Additionally, because the thruster 221 is accommodated in the support 210, the rack 233 of the coupler needs to be exposed from the support 210 to be coupled to its pinion, that is, the output gear 246. Therefore, as well illustrated in FIGS. 10 to 12, the driving unit 200 may include a channel 212e configured to make the support 210 and the power source 240 communicate with each other, so that the coupler is coupled to the external power source 240, that is, the rack 223 is coupled to the pinion 246. The channel 212e may be formed in the support 210, more precisely, the sidewall 212 of the support 210 adjacent to the power source 240. Because the support 210 includes the recess 212a formed in the sidewall 212 as described before, the channel 212e may be coupled to the recess 212a and extend toward the external power source 240 from the recess 212a. The rack 223 and the pinion 246 may be coupled to each other through the channel 212e, and the coupler may be coupled to the external power source 240.

In the above-described actual operation of the first actuator 220, the motor 242 may rotate in a first rotation direction R1 and a second rotation direction R2 opposite to the first rotation direction R1, as well illustrated in FIGS. 10 and 11. For example, the first rotation direction R1 may be a clockwise direction, and the second rotation direction R2 may be a counterclockwise direction. For example, when the motor 242 rotates in the first rotation direction R1, the output gear 246 may rotate counterclockwise, and the rack 233 engaged with the output gear 246 and the thruster 221 (i.e., the first actuator 220) may move in the first direction D1, as illustrated in FIGS. 10 and 14. On the contrary, when the motor 242 rotates in the second rotation direction R2, the output gear 246 may rotate clockwise, and the rack 233 engaged with the output gear 246 and the thruster 211 (i.e., the first actuator 220) may move in the second direction D2, as illustrated in FIGS. 11 and 15. By these movements, the driving unit 200, that is, the first actuator 220 thereof may be extended from the support 210 by a predetermined length (movement in the first direction D1) or retracted to its original position (movement in the second direction D2). Additionally, the first actuator 220, that is, the thruster 221 may move the second frame 102 coupled to the first actuator 220 in the first or second direction D1 or D2 by the extension and retraction. Accordingly, the thruster 221 may be configured to thrust the second frame 102 in the first or second rotation directions R1 or R2 relative to the support 210 by rotation of the motor 242, that is, the power source 240. Further, because the second actuator 230 is coupled to the first actuator 220, the first actuator 220 (i.e., the thruster 221) may also move the second actuator 230 in the first or second direction D1 or D2.

The driving unit 200 may further include the second actuator 230 movably coupled to the first actuator 220. The second actuator 230 is configured to move in the first or second direction D1 or D2 against the first actuator 220. Additionally, the second actuator 230 may be coupled to the third frame 103, thereby moving the third frame 103 in the first or second direction D1 or D2. Like the slide movement of the third frame 103, the movement of the second actuator 230 may also correspond to a slide movement, when a related configuration is considered. As described before, the second frame 102 is extended from or retracted to the first frame 101 by a predetermined length to extend or reduce the front surface of the mobile terminal 100. Therefore, a part of the driving unit 200 coupled to the second frame 102, that is, the first actuator 220 may also be extended from or retracted to the support 210 by the same predetermined length. On the other hand, the third frame 103 may be configured to move only within the extended or reduced second frame 102, that is, for a distance by which the third frame 103 is extended or reduced by the second frame 102, without moving beyond the second frame 102, so that the display 151 is extended from or retracted to the extended or reduced front surface of the mobile terminal 100. Accordingly, a part of the second actuator 230 coupled to the third frame 103, that is, a part of the driving unit 200 may also move within the first actuator 220 without moving outside the first actuator 220. That is, the second actuator 230 may be configured to further move within the first actuator 220 only by the extension or contraction distance of the first actuator 220. As described before, the first actuator 220 mostly includes the thruster 221, and particularly, the movement of the first actuator 220 is the same as the movement of the thruster 221. Accordingly, the thruster 221 may be regarded as the first actuator 220 itself in structural and operational correlation with other components of the first actuator 220. For this reason, the thruster 221 is described as the first actuator 210 in most cases in the following description, for convenience of description. Accordingly, unless otherwise specified, the first actuator 210 should also be understood to mean the thruster 221.

Referring to FIGS. 9 to 15 together, the second actuator 230 may include a head 231. The head 231 may be movably coupled to the first actuator 220, precisely, the thruster 221, thereby making the second actuator 230 movable relative to the first actuator 220 as a whole. Additionally, the first actuator, that is, its thruster 221 may include a guide slot 224 formed along the length direction thereof. Accordingly, the head 231 may be accommodated in the guide slot 224, and its movement may be guided by the slot 224. That is, the slot 224 may be configured to accommodate the second actuator 230 and guide the movement of the second actuator 230. As well illustrated in FIG. 12, the driving unit 200 may include an auxiliary guide for guiding the movement of the second actuator 230. The first actuator, i.e., its thruster 221 may include an auxiliary recess 224a extending from the guide slot 224 in the lateral direction of the thruster 221, as an auxiliary guide. The auxiliary recess 224a may continuously extend along the length direction of the thruster 221 to continuously guide the movement of the head 231. Additionally, the head 231 may include an auxiliary flange 231b extending laterally from its side, as an auxiliary guide. Likewise, this auxiliary flange 231b may extend continuously in the length direction of the head 231. The auxiliary flange 231b may be inserted into the auxiliary recess 224a, and accordingly, the movement of the head 231 may be guided by this auxiliary guide.

Additionally, when the first actuator 220 is coupled with the third rear part 1022 of the second frame 102, the guide slot 224 may communicate with the slot 1025 formed on the third rear part 1022. The head 231 may be exposed outward from the second frame 102 through the slots 224 and 1025 and coupled with the third frame 103. The head 231 may include a fastening hole 231a, and may be coupled with the third frame 103 by a fastening member and the fastening hole 231a. The second actuator 230 may be coupled with the third frame 103 by the head 231 and move the third frame 103. The length of the slots 224 and 1025 may correspond to a movement distance required for the third frame 103/the second actuator 230. Additionally, because the third frame 103 is configured to move the display unit 151 to the front surface or withdraw the display unit 151 from the front surface by the extension or contraction distance of the second frame 102 as described before, the length of the slots 224 and 1025 may also correspond to the movement distance required for the second frame 102, that is, the extension or contraction distance of the second frame 102, and further the length of the thruster 223. The second actuator 230 may reciprocate in the first or second directions D1 or D2 along these slots 224 and 1025 only by the limited distance within the first actuator 220.

Additionally, the second actuator 230 may include a belt 232 configured to link the movement of the head 231 to the movement of the first actuator 220, i.e., the movement of the thruster 221. Further, the belt 232 may synchronize the movement of the head 231 with the movement of the first actuator 220, that is, the movement of the thruster 221. As well illustrated in FIG. 9, the belt 232 may have an elongated body, and may be coupled to the head 231 and the support 210. That is, the belt 232 may include a first end 232a coupled to the head 231 and a second end 232b coupled to the support 210. The belt 232, that is, its body may have a length enough to allow the head 231 coupled thereto to freely move for the required distance along the guide slot 224 of the thruster 221, that is, for the extension or contraction distance of the second frame 102. Additionally, the second end 232b may be coupled to the base 211 rather than the sidewalls 212 of the support 210 so as not to interfere with the movement of the first actuator (i.e., the thruster 221). For this coupling, the base 211 may include a mount 211a.

As well illustrated in FIGS. 14 and 15, the belt 232 may be rolled into the first actuator 220 (i.e., the thruster 221) to link or synchronize the movement of the head 231 with the movement of the first actuator 220. As the belt 232 is rolled around the first actuator 220 in this way, the belt 232 may be physically coupled to the first actuator 220 and receive a force for moving at least the second actuator 230 (i.e., the head 231) from the first actuator 220. Additionally, because the belt 232 is rolled into the first actuator 220, the belt 232 may be rolled into or rolled out from the first actuator 220, when the first actuator 220 moves. That is, the movement of the second actuator (i.e., the head 231) coupled to the belt 232 may also be synchronized with the movement of the first actuator 220 by the roll-in and roll-out of this synchronized of the belt 232.

To move the third frame 103 together with the second frame 102 moved by the first actuator 220 in the same direction in addition to the synchronization, the second actuator 230 (that is, the head 231) also needs to be moved in the same direction as the first actuator 220. Accordingly, the belt 232 may be rolled out from or rolled into the first actuator 220 (i.e., the thruster 221) according to the direction of movement of the first actuator 230 (i.e., the thruster 221), so that the head 231 moves in the same direction as the first actuator 220. Because the belt 232 and the head 231 are coupled to each other, the head 231 may be pulled to move in the same direction as the first actuator 220 by the roll-in of the belt 232, and the head 231 may be pushed to move in the same direction as the first actuator 220 by the roll-out of the belt 232. More specifically, when the first actuator 220 is moved in the first direction D1 by the power of the power source 240, the second frame 102 moved by the first actuator 220 may also move and extend in the first direction D1, while applying tension to the display unit 151, and the third frame 103 and the second actuator 230 (i.e., the head 231) coupled to the end of the display unit 151 may also be moved by the applied tension. That is, when the first actuator 220 moves in the first direction D1, the second actuator 230 does not need to additionally receive power from the first actuator 220 to be synchronized with the movement. On the other hand, when the first actuator 220 moves in the second direction D1, the second frame 102 contracts, and thus the above-described tension may not be provided to the second actuator 230. However, because the second actuator 230 and the third frame 103 are coupled to other moving components in the vicinity, the movement of the third frame 103 in the second direction D2 and synchronization of the second actuator 230 for this movement of the third frame may be appropriately performed in the second direction D1 without the tension and other external force. Nevertheless, configuring the first actuator 220 to supply power to the second actuator 230, that is, the head 231 when the first actuator 220 moves in the second direction D2 may be advantageous for a smoother operation. For this reason, the belt 232 may be rolled around the end of the first actuator 220, i.e. the end of the thruster 221 adjacent to the second side part 102b of the second frame 102, i.e. the second end (221e), as illustrated in FIGS. 14 and 15. For the same reason, the second end 232b of the belt 232 may be disposed at the end of the support 210 adjacent to the second frame 102. As illustrated in FIG. 15, when the first actuator 220 moves in the second direction D2, a force may be applied to the belt 232 in an arrowed direction B by this arrangement of the belt 232. Therefore, the belt 232 may pull the head 231 to move in the second direction D2, and the synchronization of the first actuator 220 and the second actuator 220 and the movement of third frame 103 may be achieved more smoothly. Considering the above-described configuration of the belt 232, when the first actuator 220 moves in the first direction D1, the belt 232 may be rolled out from the first actuator 220 by the second frame 102/the display unit 151 moved by the first actuator 220, thereby pushing the head 231 in the first direction D1, as illustrated in FIG. 14. On the other hand, as illustrated in FIG. 15, when the first actuator 220 moves in the second direction D2, the belt 232 may be rolled into the first actuator 220 by a force applied by the first actuator 220, thereby pulling the head 231 in the second direction D2.

Additionally, for smooth roll-in and roll-out of the belt 232, the second actuator 230 may further include a pulley 233 rotatably installed on the first actuator 220 (i.e., the thruster 221). The pulley 233 may be fit around a shaft 221f formed in the first actuator 220 (i.e., the thruster 221) and supported by a bearing. Additionally, the first actuator 222 (i.e., the thruster 221) may include a seat or space 221g of a predetermined size for installation and smooth rotation of the pulley 233. Additionally, the pulley 233 may be disposed at the end of the thrust 221 adjacent to the first frame 101, that is, the second end 221e, so that the first actuator 220 applies a force to the belt 232 during the movement in the second direction, as described before. The belt 232 may be rolled on the pulley 233. The pulley 233 may feed the belt 232 in the first or second direction D1 or D2 according to the movement direction of the first actuator 220 (i.e., the thruster 221). More precisely, the pulley 233 may feed the belt 232 together with the head 231 in the same direction as the movement direction of the first actuator 220 (i.e., the thruster 221). For example, when the first actuator 220 (i.e., the thruster 221) moves in the first direction D1, the pulley 233 may feed the belt 232 in the first direction D1, thereby allowing the head 231 to move in the first direction D1. On the other hand, when the first actuator 220 (i.e., the thruster 221) moves in the second direction D2, the pulley 233 may feed the belt 232 in the second direction D1, thereby allowing the head 231 to move in the second direction D1. This operation may be equally performed by a part of the first actuator 220 (i.e., the thruster 221) on which the belt 232 is rolled, in spite of the absence of the pulley 233.

In an actual operation, when the power source 240, that is, the motor 242 rotates in the first rotation direction R1, the first actuator 220 may start moving in the first direction D1 together with the coupled second actuator 230, as illustrated in FIGS. 10 and 14. At the same time, while the second frame 102 moved by the first actuator 220 moves and extends in the first direction D1, the second frame 102 may apply tension to the display unit 151. Because the first side end 151d of the display unit 151 is fixed to the first frame 101, the opposing second side end 151e and the third frame 103 coupled thereto may be pulled in the first direction by the applied tension (see FIG. 2). The same tension is applied to the second actuator 230, that is, the head 231 coupled thereto by the third frame 103, and the head 231 is pulled in the first direction D1. As illustrated in FIG. 14, the pulley 233 may be rotated by the applied tension to feed the belt 232 in an arrowed direction A, that is, in the first direction D1, and the belt 232 may be rolled out from the first actuator 220. Accordingly, the belt 232 may allow the head 231 to move in the first direction D1 For this reason, the second actuator 230 together with the first actuator 220 may move relative to the support 210 in the first direction D1, while being carried by the first actuator 220, and further move in the first direction D1 relative to the first actuator 220. That is, while the second actuator 230 is moving against the support 210 in the first direction D1, it may further move against the first actuator 220 in the same first direction D1.

On the other hand, when the motor 242 rotates in the second rotation direction R1, the first actuator 220 may start moving in the second direction D2 together with the second actuator 230 mounted thereon, as illustrated in FIGS. 11 and 15. At the same time, the first actuator 220 may apply a force to the belt 232 in the arrowed direction B. As illustrated in FIG. 15, the pulley 233 may be rotated by the applied force to feed the belt 2332 in the arrowed direction B, that is, in the second direction D2, and the belt 232 may be rolled into the first actuator 220. Therefore, the belt 232 may pull the head 231 in the second direction D2, so that the head 231 moves in the first direction D1. The second actuator 230 may move relative to the support 210 in the second direction D2 together with the first actuator 220, while being carried by the first actuator 220, and further move relative to the support 210 in the second direction D2. That is, while the second actuator 230 is moving relative to the support 210 in the second direction D2, the second actuator 230 may further move against the first actuator 220 in the same second direction D2. As a result, the second actuator 230 may move against the support 210 as well as the first actuator 220 in the first or second direction D1 or D2 in both the movements in the first and second directions D1 and D2. Accordingly, the second actuator 230 may move for a distance required for the third frame 103 to extend and contract the display unit 151 on the front surface of the mobile terminal 100.

Considering this operation of the second actuator 230 as described above, when the first actuator 220 moves in the first direction D1, the belt 232 may be configured to be rolled out from the first actuator 220 to move together with the third frame 103 coupled to the head 231. Additionally, when the first actuator 220 moves in the second direction D2, the belt 232 may be configured to be rolled into the first actuator 220 to pull the head 231 in the second direction D2. That is, the first actuator 220 may be configured to release the belt 232 in the first direction D1 so that the head 231 freely moves in the first direction together with the third frame 103 coupled thereto, while the first actuator 220 moves in the first direction D1. The first actuator 220 may be configured to wind the belt 232 in the second direction D2 while moving in the second direction (D2), so that the head 231 moves in the second direction D2.

Accordingly, when the first actuator 220 moves in the first direction D1, the second actuator 230 may be configured to move in the first direction D1 together with the third frame 103, while receiving force or power in first direction D1 from the second frame 102 and the flexible display 151 moved by the first actuator 220. Additionally, when the first actuator 220 moves in the second direction D2, the second actuator 230 may be configured to move, while receiving force or power in the second direction D2 directly from the first actuator 220. That is, the second actuator 230 may be configured to freely move in the first direction D1 together with the third frame 103 in order to be indirectly driven by the first actuator 220, during the movement in the first direction D1. During the movement in the second direction D2, the second actuator 230 may be configured to be forcedly moved in the second direction D2 by the first actuator 220. Consequently, the first actuator 220 may be configured to be driven by the power source 240, while the second actuator 230 may be configured to be driven by the first actuator 220. That is, the second actuator 230 may receive power from the first actuator 220, and its movement may be controlled by the first actuator 220.

Additionally, the belt 232 of the second actuator 230 may be rolled into the first actuator 220 and thus physically coupled to the first actuator 220, as described before. The head 231 of the second actuator 230 may be coupled to the belt 232. Accordingly, the second actuator 230, that is, the head 231 may be moved simultaneously with the movement of the first actuator 220 by the belt 232. For this reason, the driving unit 200 may synchronize the movement of the second actuator 230 with the movement of the first actuator 220 by the belt 232.

More specifically, the driving unit 200 may be configured to drive the first and second actuators 220 and 230 together by using the belt 232, and accordingly, synchronize the starting time of the movement of the second actuator 230 with the starting time of the movement of the first actuator 220. Additionally, as well illustrated in FIGS. 14 and 15, the second actuator 230 may be disposed at the opposite ends of the first actuator 220, that is, the thruster 221, that is, at the first and second ends 221d and 221e in the first and second states, and these ends 221d and 221e may correspond to the starting time points of movement of the first actuator 220 for state switching of the mobile terminal. Accordingly, the driving unit 200 may start to move the first and second actuators 220 and 230 at the same position. In addition to synchronization between the movement starting time points and movement starting positions, the driving unit 200 may be configured to synchronize the movement speed of the second actuator 230 with the movement speed of the first actuator 220. More specifically, the second actuator 230 may be configured to be powered by the first actuator 220 or other components 102 and 151 driven by the first actuator 220 by using the belt 232, as described before. Accordingly, when the first actuator 220 moves a predetermined distance for a predetermined time, the belt 232 and the head 231 coupled thereto (that is, the second actuator 230) may also move the same distance for the same time. For this reason, the driving unit 200 may simultaneously move the first and second actuators 220 and 230 together with the second and third frames 102 and 103 coupled thereto by the same distance within the same time from the same point. Additionally, because while being carried a predetermined distance by the first actuator, the second actuator 230 additionally moves the same distance as described before, the third frame 103 coupled thereto may move a required long distance. For this reason, the driving unit 200 may increase and decrease the front surface of the mobile terminal 100 and extend and reduce the display unit 151 according to the increase or decrease of the front surface.

Based on the above-described configuration of the driving unit 200, the operation of the mobile terminal 100 will be described below in detail in connection with the operation of the driving unit 200. FIG. 16 is a side sectional view illustrating the states of the first to third frames under the action of the driving unit in the first state, and FIG. 17 is a side sectional view illustrating the states of the first to third frames under the action of the driving unit in the second state. In FIGS. 16 and 17, the driving unit 200 is illustrated enlarged outside the mobile terminal in order to better illustrate the correlation with the first to third frames 101 to 103. Further, in FIGS. 16 and 17, the coupling relationship between the components of the driving unit 200 and the first to third frames 101 to 103 is indicated by dotted lines.

As illustrated in FIG. 16, in the first state, the second frame 102 is fully retracted into the first frame 102. Accordingly, only the first region 1511 of the display unit 151 fixed to the front surface of the first frame 101 may be exposed on the front surface of the mobile terminal 100. Additionally, most of the third region 1513 may be disposed on the rear surface of the mobile terminal 100, together with the second region 1512, and may be disposed partially in the second frame 102 in a state of being rolled around the roller 1028. The third frame 101 is coupled with the second region 1512 and disposed at a first point A1 on the rear surface of the mobile terminal 100.

In connection with the arrangement of these frames 101 and 102, the support 210 of the driving unit 200 is fixed to the first frame 101, that is, the first front part 1011 of the first frame 101. Additionally, the first actuator 220 may be coupled to the second frame 102, that is, the third rear part 1022 of the second frame 102 and fully retracted into the support 210, like the second frame 102. Additionally, the second actuator 230 may be coupled to the third frame 103 through the second frame 102, that is, the third rear part 1022 of the second frame 102, and may also be disposed at the first point A1.

In this first state, when the second frame 102 moves in the first direction D1, the mobile terminal 100 may transition to the second state. Referring to FIG. 17, for the state transition, the first actuator 220 may start moving together with the second frame 102 coupled to the first actuator from the first point A1 in the first direction D1 against the first frame 101/the support 210. Because the second actuator 230 is synchronized with the first actuator 220 by the thruster 222 as described before, the second actuator 230 may start moving together with the third frame from the first point A1 in the first direction D1, simultaneously with the movement of the first actuator 220. The first actuator 220 may continue to move relative to the first frame 101 by a first distance d1 between the first point A1 and a second point A2, and as a result of this movement, the first actuator 220 may extend to a third point A3. Accordingly, the second frame 102 may also move the first distance d1 by the first actuator 220 and extend to the third point A3. Because the first actuator 220 and the second frame 102 extend to the third point A3 by the first distance d1, a second distance d2 between the second point A2 and the third point A3, that is, the extension distance is equal to the first distance d1. While the first actuator 220 and the second frame 102 move and extend to the third point A3 relative to the first frame 101/the support 210, the second actuator 230 and the third frame may further move relative to the second frame 102/the first actuator 220 in the first direction D1 along the first actuator 220, simultaneously with movement in the first distance d1 relative to the first frame 101/the support 210, while being carried by the first actuator 220. Upon completion of the movement and extension of the first actuator 220 and the second frame 102 to the third point A3, the second actuator 230 and the third frame 103 may also move from the first point A1 through the second point A2 to the third point A3, and as a result, the second actuator 230 may further move the second distance d2 in addition to the first distance d1, that is, the extension distance of the second frame 102. That is, the second actuator 230 and the third frame 103 may move twice the first distance d1 or the second distance d2. Due to the movement of the second actuator 230 and the third frame 103 as described above, the third region 1513 of the display unit 151 may move to the front surface of the mobile terminal 100 by the extension distance through the second frame 102, that is, the second distance d2. Because the movement of the second actuator 230 and the third frame 103 is synchronized with the movement of the first actuator 220 and the second frame 102 as described above, the display unit 151 may also be moved smoothly.

When the second frame 102 fully extends in the first direction D1, the first and third regions 1511 and 1513 are disposed on the front surface of the mobile terminal 100, and only the second region 1512 may be disposed on the rear surface of the mobile terminal 100. Therefore, the mobile terminal 100 may have the extended front display unit 151 in the second state.

On the other hand, when the second frame moves in the second direction D2 in the second state, the mobile terminal 100 may return from the second state of FIG. 17 to the first state of FIG. 16. For this state transition, the first actuator 220 may start moving from the third point A2 in the second direction D2 together with the second frame 102 coupled to the first actuator 220, relative to the first frame 101/the support 210. Simultaneously with the movement of the first actuator 220, the second actuator 230 may also start moving from the same third point A3 in the second direction D2 together with the third frame 103. The first actuator 220 may continue to move relative to the first frame 101 by the second distance d2 between the third point A3 and the second point A1. As a result of this movement, the first actuator 220 may be retracted to the first point A1. Accordingly, the second frame 102 may also move the second distance d2 by the first actuator 220 and retract to the first point A1. While the first actuator 220 and the second frame 102 move and retract to the first point A1 relative to the first frame 101/the support 210, the second actuator 230 and the third frame 103 may move the second distance d2 relative to the first frame 101/the support 210, while being carried by the first actuator 220, and at the same time, may further move in the second direction along the first actuator 220 relative to the second frame 102/the first actuator 220. Upon completion of the movement and retraction of the first actuator 220 and the second frame 102 to the first point A1, the second actuator 230 and the third frame 103 may move from the third point A2 through the second point A2 to the first point A1 and as a result, may further move the first distance d1 in addition to the second distance d2, that is, the contraction distance of the second frame 102. That is, the second actuator 230 and the third frame 103 may move twice the first distance d1 or the second distance d2. Due to the movement of the second actuator 230 and the third frame 103 as described above, the third region 1513 of the display unit 151 may return to the rear surface of the mobile terminal 100 by the contraction distance through the second frame 102, that is, the first distance d1. Additionally, because the movement of the second actuator 230 and the third frame 103 is synchronized with the movement of the first actuator 220 and the second frame 102, the display unit 151 may also be moved smoothly. When the second frame 102 is fully retracted in the second direction, the second frame 102 may transition to the first state as described before.

Figure 18:
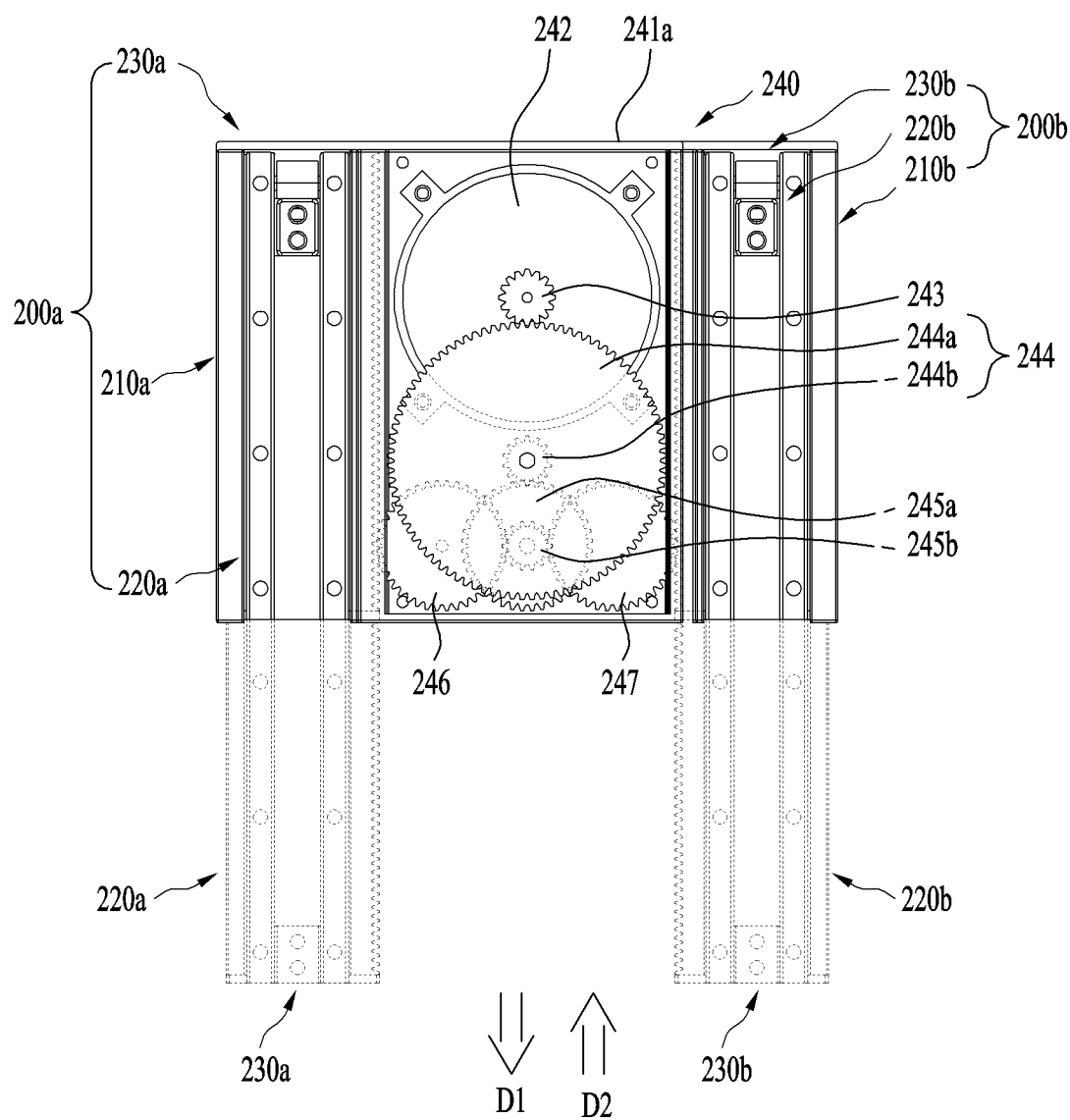
FIG. 18 is a plan view illustrating a modification example of the driving unit.

The driving unit 200 illustrated in FIGS. 9 to 15 may be deformed for more stable and accurate movement of the second and third frames 102 and 103, and such a modification example is illustrated in FIG. 18. FIG. 18 is a plan view illustrating a modification example of the driving unit.

Referring to FIG. 18, the driving unit 200 is configured to have a dual actuator. For the dual actuator system, the driving unit 200 may include a first actuator assembly 200a (hereinafter, referred to as a first assembly) and a second actuator assembly 200b (hereinafter referred to as a second assembly) which share the same power source 240. The first and second assemblies 200a and 200b may be coupled with the power source 240 to receive power from the power source 240. More specifically, the first and second assemblies 200a and 200b may be respectively coupled to both sides of the power source 240, apart from each other by a predetermined distance, as illustrated.

The first assembly 200a may include a support 210a, a first actuator 220a, and a second actuator 230a, which are substantially identical to the support 210, the first actuator 220, and the second actuator 230 described above. Accordingly, the description of the support 210 and the first and second actuators 220 and 230 may be applied to the first assembly 200a and the components 210a to 230a of the first assembly 200a, and a redundant description will be omitted below. Additionally, the second assembly 200b also includes a support 210b, a first actuator 220b, and a second actuator 230b, which are identical to the support 210, the first actuator 220, and the second actuator 230 on the whole. Additionally, the power source 240 is also substantially identical to the power source 240 described with reference to FIGS. 9 to 15. Accordingly, the description of the corresponding configuration given with reference to FIGS. 9 to 15 is also applied to the second assembly 200b and the power source 240, and only a different configuration will be described below.

The power source 240 may include a first output gear 246 and a second output gear 247 meshed together with the second driven gear 245b of the second gear set 245 (see FIGS. 10 to 13). The first output gear 246 is coupled with the first actuator 220a of the first assembly 200a to supply power to the first assembly 200a, and for this coupling, a coupler of a rack-pinner structure as described above may be used. The second output gear 247 is coupled with the first actuator 220b of the second assembly 200b to supply power to the second assembly 200b, and the same coupler may be used. Accordingly, when the motor 242 of the power source 240 rotates, the gear train G may output power having an adjusted number of revolutions and magnitude through the first and second output gears 246 and 247 to the first and second assemblies 200a and 200b simultaneously, precisely their first actuators 220a and 220b. As described before, the driving unit 200 may move the first and second actuators 220a, 220b, 230a, and 230b of the first and second assemblies 200a and 200b together with the second and third frames 102 and 103 coupled with them by using the supplied power.

In consideration of the configuration described above, the driving unit 200 of FIG. 18 may include two actuators which are spaced from each other and coupled with the second and third frames 102 and 103, that is, the first and second assemblies 200a and 200b. Accordingly, the second and third frames 102 and 103 may be stably supported during movement by these two assemblies 200a and 200b, and thus may be accurately moved without distortion. Additionally, the movement of the first and second assemblies 200a and 200b, that is, the movement of the actuators therein may be primarily synchronized by the power source 240, precisely the output gears 246 and 247, as described above. Accordingly, the first and second frames 102 and 103 may move more stably and more accurately.

The above detailed description is to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A mobile terminal comprising:
   a first frame;
   a second frame movably coupled with the first frame and configured to move in a first direction with respect to the first frame;
   a third frame movably coupled with the second frame and configured to move in the first direction with respect to the second frame;
   a flexible display including a first region disposed on a front surface of the mobile terminal and coupled with the first frame, a second region disposed on a rear surface of the mobile terminal and coupled with the third frame, and a third region extending between the first region and the second region, wherein the third region is rolled in the second frame and selectively disposed on the front surface of the mobile terminal or the rear surface of the mobile terminal according to a movement direction of the second frame; and
   a driving unit configured to transition the mobile terminal from a first state to a second state by moving the second and third frames in the first direction,
   wherein only the first region of the flexible display unit is disposed on the front surface of the mobile terminal in the first state, and the third region is disposed together with the first region on the front surface of the mobile terminal in the second state,
   wherein the driving unit comprises:
      a support coupled with the first frame;
      a first actuator coupled with the support to move the second frame in the first direction with respect to the first frame; and
      a second actuator coupled with the first actuator to move the third frame in the first direction with respect to the second frame, and
   wherein the driving unit is further configured to:
      withdraw the third region from the second frame to the front surface of the mobile terminal according to the movement of the second frame in the first direction, for the transition to the second state; and
      synchronize the movement of the third frame with the movement of the second frame.

2. The mobile terminal according to claim 1, wherein the driving unit is further configured to:
   move the second frame and the third frame in a second direction opposite to the first direction;
   transition the mobile terminal from the second state to the first state by moving the second and third frames in the second direction; and
   retract the withdrawn third region from the front surface of the mobile terminal to the second frame, for the transition to the first state.

3. The mobile terminal according to claim 2, wherein the second actuator is configured to freely move together with the third frame in the first direction during movement in the first direction, and to be forcedly moved in the second direction by the first actuator during movement in the second direction.

4. The mobile terminal according to claim 2, wherein the second actuator is configured to:
   when the first actuator moves in the first direction, receive power in the first direction from the second frame and the flexible display unit moved by the first actuator; and
   when the first actuator moves in the second direction, receive power in the second direction directly from the first actuator.

5. The mobile terminal according to claim 1, wherein the driving unit is further configured to synchronize a position at which the third frame starts moving with a position at which the second frame starts moving.

6. The mobile terminal according to claim 1, wherein the driving unit is further configured to synchronize a time point at which the third frame starts moving with a time point at which the second frame starts moving.

7. The mobile terminal according to claim 1, wherein the driving unit is further configured to synchronize a movement speed of the third frame with a movement speed of the second frame.

8. The mobile terminal according to claim 1, wherein the driving unit is further configured to synchronize movement of the second actuator with movement of the first actuator.

9. The mobile terminal according to claim 1, wherein the support comprises sidewalls facing both sides of the first actuator and configured to support movement of the first actuator.

10. The mobile terminal according to claim 1, wherein the first actuator comprises a power source configured to supply power to the first actuator, and is configured to move in the first direction by rotation of the power source in a first rotation direction.

11. The mobile terminal according to claim 10, wherein the first actuator further comprises:
a thruster movably coupled with the support; and
a coupler configured to transmit the power from the power source to the thruster, and
wherein the thruster is configured to thrust the second frame in the first direction by using the power transmitted by the coupler.

12. The mobile terminal according to claim 11, wherein the coupler is further configured to couple the power source with the thruster by using a gear.

13. The mobile terminal according to claim 11, wherein the coupler is further configured to transform a rotation movement of the power source into a linear movement.

14. The mobile terminal according to claim 11, wherein the coupler comprises a rack provided on the thruster and extending along a length direction of the thruster, and a pinion provided on the power source and engaged with the rack, and
wherein the pinion is configured to linearly move the engaged rack and the thruster, while rotating.

15. The mobile terminal according to claim 10, wherein the power source comprises:
a motor; and
a gear train rotatably coupled with the motor and including a plurality of intermeshing gears, and
wherein the gear train is configured to reduce a rotation speed of the motor input to the gear train.

16. The mobile terminal according to claim 1, wherein the driving unit further comprises a guide configured to guide movement of the first actuator with respect to the support, and
wherein the guide comprises:
a flange protruding from the first actuator toward the support and extending in a length direction of the first actuator; and
a recess formed in the support along a length direction of the support and configured to accommodate the flange.

17. The mobile terminal according to claim 16, wherein the guide further comprises:
a retainer formed on a surface of the recess facing the flange; and
a bearing accommodated in the retainer and contacting a surface of the flange.

18. The mobile terminal according to claim 1, wherein the second actuator is configured to be moved by the first actuator.

19. The mobile terminal according to claim 1, wherein the second actuator comprises:
a head movably coupled with the first actuator; and
a belt coupled to each of the head and the support, and rolled in the first actuator, and
wherein the belt is configured to synchronize movement of the head with movement of the first actuator.

20. The mobile terminal according to claim 19, wherein the belt is further configured to move the head in the same direction as a movement direction of the first actuator.

21. The mobile terminal according to claim 19, wherein the belt is further configured to be rolled out from the first actuator or rolled in the first actuator according to a movement direction of the first actuator, to move the head in the same direction as the movement direction of the first actuator.

22. The mobile terminal according to claim 19, wherein when the first actuator moves in the first direction, the belt is further configured to be rolled out from the first actuator to move the head together with the third frame coupled to the head in the first direction, and
when the first actuator moves in a second direction opposite to the first direction, the belt is further configured to be rolled in the first actuator to pull the head in the second direction.

23. The mobile terminal according to claim 19, wherein the second actuator further comprises a pulley installed on the first actuator and configured to feed the belt in the first direction or a second direction opposite to the first direction according to a movement direction of the first actuator.

24. The mobile terminal according to claim 23, wherein the pulley is further configured to feed the belt in the same direction as the movement direction of the first actuator.

25. The mobile terminal according to claim 1, wherein the first actuator further comprises a guide slot formed along a length direction of the first actuator and configured to accommodate the second actuator and guide movement of the second actuator.

* * * * *